United States Patent

Yoshida

[11] Patent Number: 5,930,234
[45] Date of Patent: Jul. 27, 1999

[54] COUNTER OVERFLOW PROCESSING METHOD AND DEVICE, DEVICE AND METHOD FOR CONTROLLING FLOW OF CELLS

[75] Inventor: Kazuhiro Yoshida, Kanagawa, Japan

[73] Assignee: Fujitsu Limited, Kanagawa, Japan

[21] Appl. No.: 08/738,892

[22] Filed: Oct. 28, 1996

[30] Foreign Application Priority Data

Feb. 19, 1996 [JP] Japan .................................. 8-030715

[51] Int. Cl.⁶ .............................. H04J 3/14; H04L 12/26
[52] U.S. Cl. ............................................. 370/232; 370/253
[58] Field of Search .................................. 370/229–238, 370/395, 253

[56] References Cited

U.S. PATENT DOCUMENTS

| | | | |
|---|---|---|---|
| 5,276,676 | 1/1994 | Horn et al. ................................. | 370/17 |
| 5,280,483 | 1/1994 | Kamoi et al. . | |
| 5,335,222 | 8/1994 | Kamoi et al. . | |
| 5,381,411 | 1/1995 | Ohno et al. . | |
| 5,394,396 | 2/1995 | Yoshimura et al. . | |
| 5,432,713 | 7/1995 | Takeo et al. . | |
| 5,465,348 | 11/1995 | Amemiya et al. . | |
| 5,581,544 | 12/1996 | Hamada et al. . | |
| 5,706,288 | 1/1998 | Radhakrishnan et al. ............... | 370/418 |

FOREIGN PATENT DOCUMENTS

| | | |
|---|---|---|
| 5-183570 | 7/1993 | Japan . |
| 5-191433 | 7/1993 | Japan . |
| 5-244188 | 9/1993 | Japan . |
| 5-252191 | 9/1993 | Japan . |
| 5-268239 | 10/1993 | Japan . |
| 5-276186 | 10/1993 | Japan . |
| 5-276188 | 10/1993 | Japan . |
| 6-132862 | 5/1994 | Japan . |
| 6-177903 | 6/1994 | Japan . |
| 6-178373 | 6/1994 | Japan . |
| 6-197123 | 7/1994 | Japan . |
| 6-315034 | 11/1994 | Japan . |
| 7-7505 | 1/1995 | Japan . |
| 7-170274 | 7/1995 | Japan . |

*Primary Examiner*—Melvin Marcelo
*Attorney, Agent, or Firm*—Helfgott & Karas, P.C.

[57] ABSTRACT

A counter value $t_{cd}$ obtained by subtracting the cell identification number corresponding to a connection $c_n$ from a global time counter value $t_c$ is defined as a local time counter value corresponding to the connection $c_n$. An overflow flag of the local time counter value $t_{cd}$, OVF, is simply updated only for the connection $c_n$ at the time when the global time counter value $t_c$ reaches the cell identification number n for the connection $c_n$. The time when a cell for the connection $c_n$ is received is detected by subtracting the cell identification number n for the connection $c_n$ from the global time counter value $t_c$ at the time when that cell is received, which corresponds to the local time counter value $t_{cd}$ at that time.

16 Claims, 24 Drawing Sheets

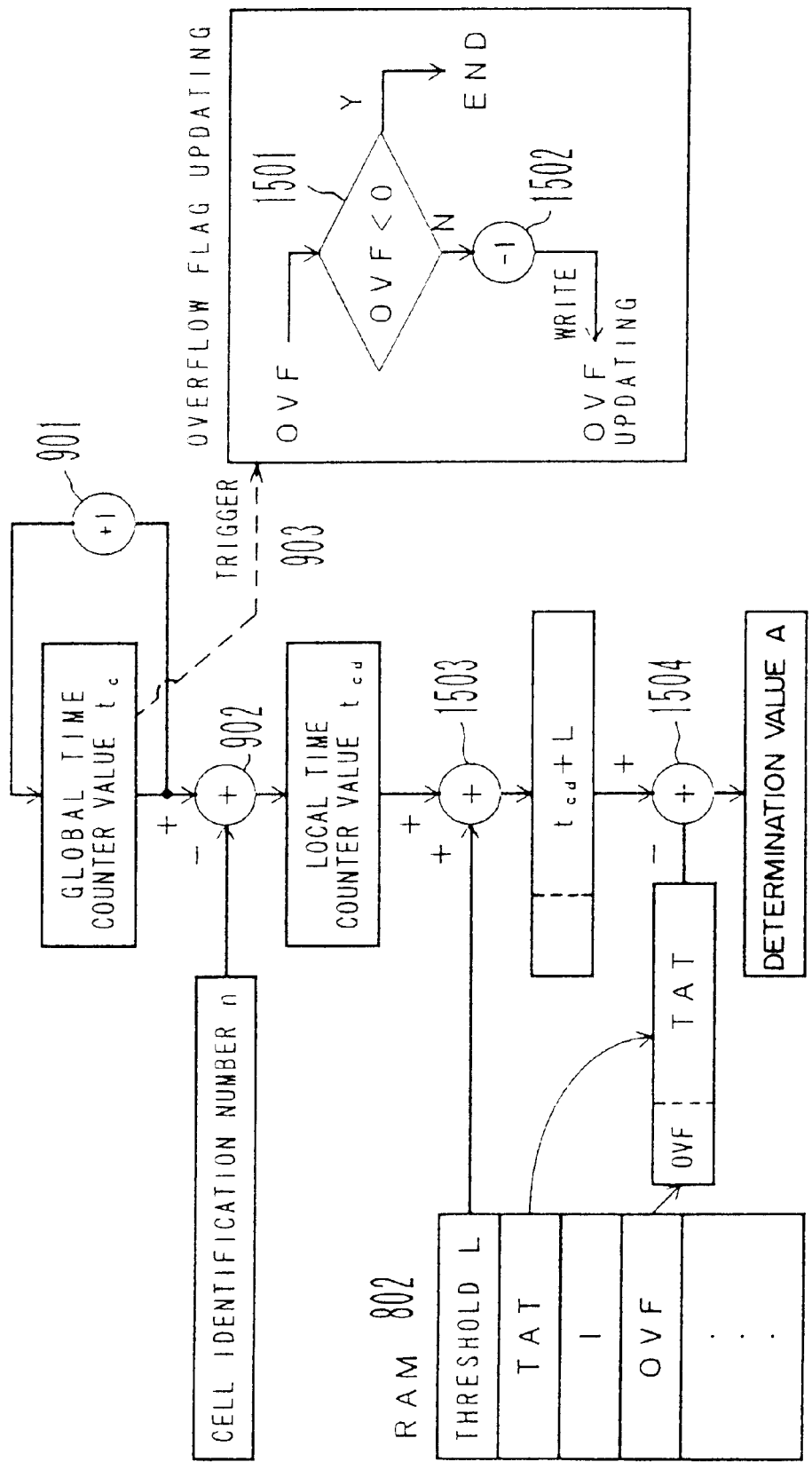
F I G. 15

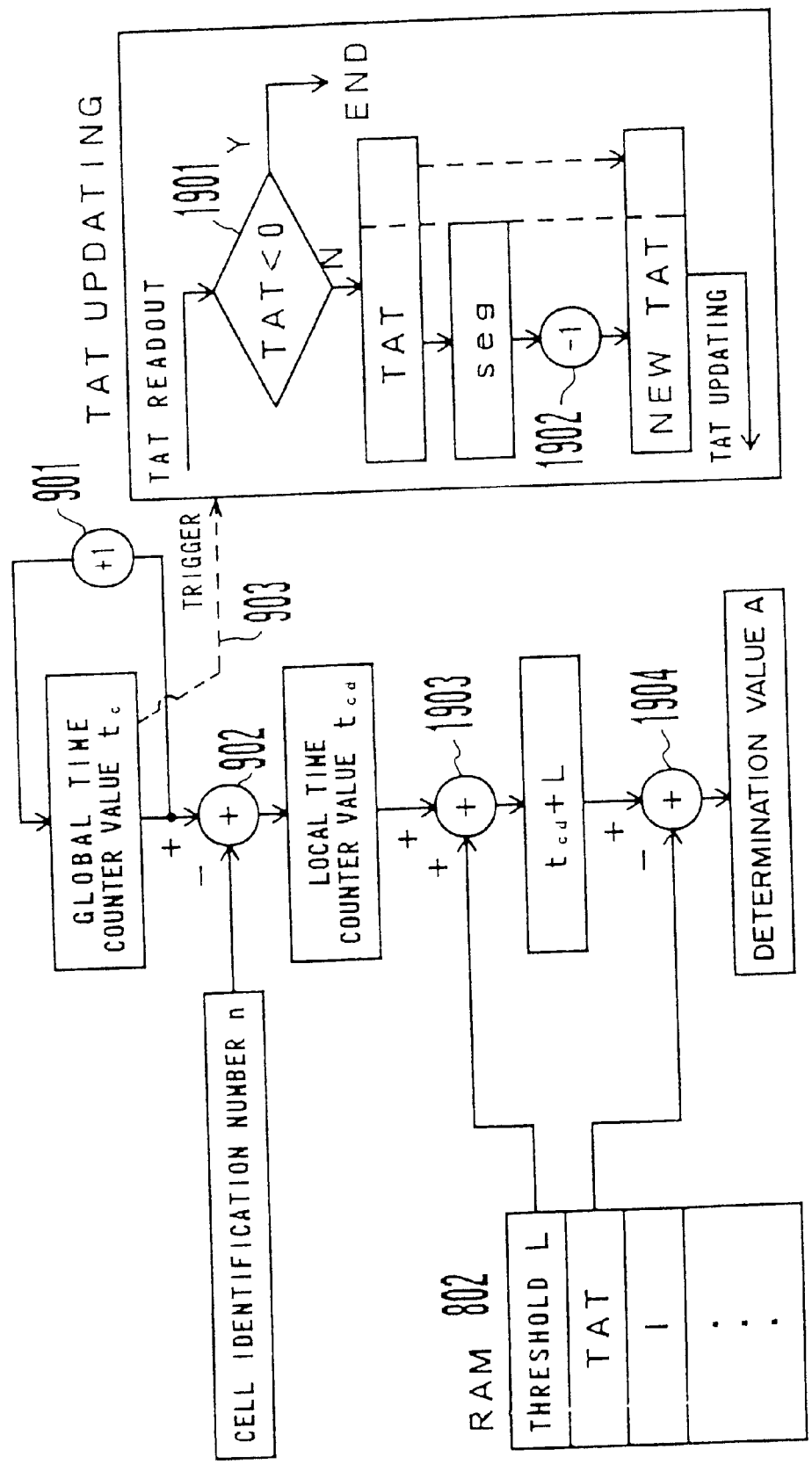
F I G. 19

COUNTER OVERFLOW PROCESSING METHOD AND DEVICE, DEVICE AND METHOD FOR CONTROLLING FLOW OF CELLS

BACKGROUND OF THE INVENTION

1. Field of the Invention

The invention relates to a parallel counting technique for objects (connections) to be counted in parallel, such as a UPC or NPC function for monitoring the proper rate of flow of cells in a UNI or NNI in an ATM switching unit.

2. Description of the Related Art

An ATM (Asynchronous Transfer Mode) type of switching unit is equipped with a UPC (Usage Parameter Control) or NPC (Network Parameter Control) function for monitoring the proper rate of flow of cells in a UNI (User-to-Network Interface) or NNI (Network-to-Network Interface).

In the UPC or NPC function, a cell flow rate monitoring algorithm called a leaky bucket (LB) algorithm or virtual scheduling (VS) algorithm is used. A problem of cell flow interval is associated with these algorithms. Thus, a time counter is needed which is a clock for managing times at which cells are received. In this case, the time counter is implemented by hardware or software to have a predetermined bit length and so its count length is not unlimited.

The time counter has a limited count range as described above and provides the same count output at regular intervals. To calculate the difference (cell interval) between the time when the previous cell was received and the time when the present cell is received for each connection, it is required to store in memory an overflow flag for each connection, which indicates how many times the counter overflowed (regression from the maximum count to zero) during the cell interval. To calculate the cell interval, it is required to refer to the overflow flag stored in the memory as well as the counter value when the present cell is received and the stored counter value when the previous cell was received.

Conventionally, the same time counter is used for calculating the cell intervals for all the connections. In this case, a fixed amount of time is required from the time when the counter overflows to the time when overflow flags for all the connections stored in the memory have been updated. For example, when the count in the time counter periodically varies with time t as shown in FIG. 1, although the overflow flag for the connection $c_0$ in the memory is updated at the overflow flag processing time $t_0$, i.e., at about the same time an overflow occurs in the time counter, the overflow flag for an arbitrary connection $c_n$ will not be updated until a fixed time tn elapses after the occurrence of the overflow in the time counter. For this reason, if, after an overflow occurs in the time counter, a cell corresponding to a connection for which the corresponding overflow flag is not updated yet is received, the cell interval for that connection would be calculated on the basis of the wrong (unprocessed) overflow flag. The cell interval in this case becomes inaccurate (short). For example, in FIG. 1, when a cell corresponding to the connection $c_n$ is received between the overflow processing times $t_0$ and $t_n$, the cell interval calculated for that connection $c_n$ will be shorter by one overflow period.

The above problems will arise not only in the UPC or NPC function in an ATM switching unit, but also in processing of overflow in a counter for a plurality of objects to be counted in parallel.

SUMMARY OF THE INVENTION

It is an object of the invention to permit overflow flags to be updated without inconsistency.

According to a first aspect of the invention there is provided an overflow processing method for counters for performing a counting operation on a plurality of objects to be counted in parallel over the same range, which is arranged as follows.

A separate counter value is used for each of the objects, which is different from the other.

An overflow process is performed on each counter value corresponding to a respective one of the objects at a time that differs from object to object. More specifically, each of the counter values has a unique offset value with respect to a reference counter value.

According to the first aspect of the invention, the overflow processing is performed only on one counter value at a time, thus allowing the burden on the overflow process to be distributed.

A second aspect of the invention is directed to an overflow processing method, for use in a cell switching system for switching fixed-length cells, for counters which perform a counting operation on a plurality of connections over the same range in parallel to count times when cells are received for each of the connections, which is arranged as follows.

First, a local time counter value is counted which is a counter value having a unique offset value with respect to a global time counter value which is a reference time counter value common to the connections.

Next, an overflow process is performed for each of the connections on the local time counter value at the time when the global time counter value reaches the offset value corresponding to the connection.

According to the second aspect of the invention, the counter value overflow processing is performed for only one connection at a time when the global time counter value reaches a corresponding value, thus allowing the overflow processing to be completed in a time shorter than the cell time taken to receive one cell. Consequently, even if, during the cell time containing a time when one local time counter value just overflows, a cell for the connection corresponding to that local time counter value is unintentionally received, the overflow flag processing can be completed for that connection during a first fixed period within the cell time. And if the cell flow control is performed for that connection within the same cell time immediately after the fixed period, the correct cell flow control will always be performed.

A third aspect of the invention is directed to a cell flow control method based on a leaky bucket algorithm for counting cell intervals at which cells are received and evaluating the cell interval to thereby control the flow of cells, which is arranged as follows.

First, for each of the connections, a local time counter value is counted which is a counter value having a unique offset value with respect to a global time counter value which is a reference time counter value.

Next, for each of the connections, the overflow state of the local time counter value is updated at the time when the global time counter value reaches the offset value corresponding to the connection. For example, the overflow state corresponds to one of a state where no overflow has occurred, a state where overflow has occurred once, and a state where overflow has occurred twice or more.

Finally, when a cell for a connection is being received, the time interval between the time of receiving that cell and the time of receiving a previously received cell for that connection is evaluated on the basis of the local time counter value for the connection and the overflow state of the local time counter value for the connection to thereby make a conformity/nonconformity determination for the cell being received.

According to the third aspect of the invention, the cell flow control based on the leaky bucket algorithm can be performed efficiently and without inconsistency in addition to the effect of the second aspect of the invention.

A fourth aspect of the invention is directed to a cell flow control method based on a virtual scheduling algorithm for counting cell flow times at which cells are received for each of connections over the same range and making a comparison between the time when a cell is received and a time of receiving the next incoming cell predicted at the time when the previous cell was received to thereby control the flow of cells, which is arranged as follows.

First, for each of the connections, a local time counter value is counted which is a counter value having a unique offset value with respect to a global time counter value which is a reference time counter value.

Next, when a cell is received, a predicted time when the next cell will be received is calculated on the basis of a local time counter value corresponding to a connection associated with the cell being received, and the overflow state of the local time counter value at the predicted time for the next cell is calculated.

Moreover, for each connection, the overflow state of the local time counter value is updated at the time when the global time counter value reaches the offset value corresponding to the connection.

Furthermore, when a cell associated with a connection is being received, the time of receiving the cell for the connection is evaluated on the basis of the local time counter value for the connection, the overflow state of the local time counter value for the connection, and the predicted time for reception of the next cell.

According to the fourth aspect of the invention, the cell flow control based on the virtual scheduling algorithm can be performed efficiently and without inconsistency in addition to the effect of the second aspect of the invention.

A fifth aspect of the invention is arranged more specifically than the fourth aspect as follows.

First, at the time when a cell is received, a predicted time when the next cell will be received on the basis of a local time counter value corresponding to a connection associated with the cell being received is calculated and an overflow flag is set which indicates whether or not the local time counter value corresponding to the connection overflows until the predicted time for the next cell is reached.

Next, at the time when the global time counter value reaches the offset value corresponding to a connection, the overflow flag for the local time counter value corresponding to the connection is reset if it has been set, and reset information is set to indicate resetting has occurred if the overflow flag has not been set.

Moreover, when a cell associated with a connection is being received, the time of receiving the cell for the connection is evaluated on the basis of the local time counter value for the connection, the overflow state of the local time counter value for the connection, the reset information corresponding to the connection, and the predicted time for reception of the next cell.

According to the fifth aspect of the invention, the cell flow control based on the virtual scheduling algorithm can be performed more efficiently in addition to the effect of the fourth aspect.

A sixth aspect of the invention is arranged more specifically than the fourth aspect as follows.

First, at the time when a cell is received, a predicted time when the next cell will be received is calculated on the basis of a local time counter value corresponding to a connection associated with the cell being received, and the number of times of overflow is set which indicates the number of times the local time counter value overflows until the predicted time is reached.

Next, at the time when the global time counter value reaches the offset value for a connection, the number of times of overflow of the local time counter value corresponding to the connection is decremented by one.

Moreover, when a cell associated with a connection is being received, the time of receiving the cell for the connection is evaluated on the basis of the local time counter value for the connection, the number of times the local time counter value for the connection overflows, information indicating whether or not the number of times of overflow is a negative value, and the predicted time of receiving the next cell.

According to the sixth aspect of the invention, the cell flow control based on the virtual scheduling algorithm can be performed over a wider time range in addition to the effect of the fourth aspect.

A seventh aspect of the invention is directed to a cell flow control method based on a virtual scheduling algorithm for counting cell flow times at which cells are received for each of connections over the same range, and making a comparison between the time when a cell is received and a time of receiving the next incoming cell predicted at the time when the previous cell was received to thereby control the flow of cells, which is arranged as follows.

First, for each of said connections, a local time counter value which is a counter value having a unique offset value with respect to a global time counter value which is a reference time counter value is counted.

Next, at the time when a cell is received, a predicted time when the next cell will be received on the basis of a local time counter value corresponding to a connection associated with the cell being received is calculated in floating-point representation.

Moreover, for each connection, the sum of the maximum value of the local time counter value corresponding to the connection and the value one is subtracted from the predicted time for the next cell corresponding to the connection at the time when the global time counter value reaches the offset value corresponding to the connection.

Furthermore, when a cell associated with a connection is being received, the time interval between the time of receiving the cell and the time of receiving a previous cell corresponding to the connection is evaluated on the basis of the local time counter value for the connection and the predicted time for the next cell corresponding to the connection to thereby make a conformity/nonconformity determination for the cell being received.

According to the seventh aspect of the invention, the cell flow control based on the virtual scheduling algorithm can be performed more precisely in addition to the effect of the second aspect of the invention.

Note that the invention can also be implemented as devices having the same functions as the methods according to the aspects of the invention.

BRIEF DESCRIPTION OF THE DRAWINGS

Other objects and advantages of the present invention will be apparent from the following description of the preferred embodiments of the invention in conjunction with the accompanying drawings in which:

FIG. 15 is the first operational flowchart of the first embodiment based on the VS algorithm;

FIG. 19 is the first operational flowchart of the second embodiment based on the VS algorithm;

DETAILED DESCRIPTION OF THE PREFERRED EMBODIMENTS

The principles of the respective preferred embodiments of the invention will be described first prior to the description of the embodiments.

Basic Principles

In the preferred embodiments of the invention, a time count (which is defined as a local time counter value) is used for each connection, which is shiftted from a reference time count (which is defined as a global time counter value). As a result, when one local time counter value overflows, the number of connections that requires to update an overflow flag is one. The process of updating the overflow flag for this connection can be completed in a shorter time than the time taken for one cell to be received (referred to as the cell time). Consequently, even if, during the cell time including a time at which one local time count just overflows, a cell corresponding to a connection for that local time counter value is unitentionally received, the process of updating the overflow flag for that connection can be completed within a fixed period of time at the beginning of the cell time. Thus, if the cell interval in the connection is calculated immediately after the fixed period in the same cell time, it will always be calculated correctly.

To be specific, in the preferred embodiments of the invention, a counter value obtained by subtracting a cell identification number that is uniquely determined by the connection identifier VPI(virtual path identifier)/VCI (virtual channel identifier) for one connection from the global time counter value is defined as the local time counter value for that connection. More specifically, this subtraction is implemented as an add operation which adds the global time counter value to a number obtained by adding one to a string of bits each of which is the inverse of the corresponding respective one of bits in data indicating the cell identification number, i.e., the obtained number is the two's complement of the cell identification number. As a result, at the time when the global time counter value reaches the cell identification number for one connection, the local time counter value for that connection will certainly overflow. For this reason, it is necessary only that the process of updating the overflow flag for one connection be performed at the time when the global time counter value reaches the cell identification number for that connection.

Figure 1:
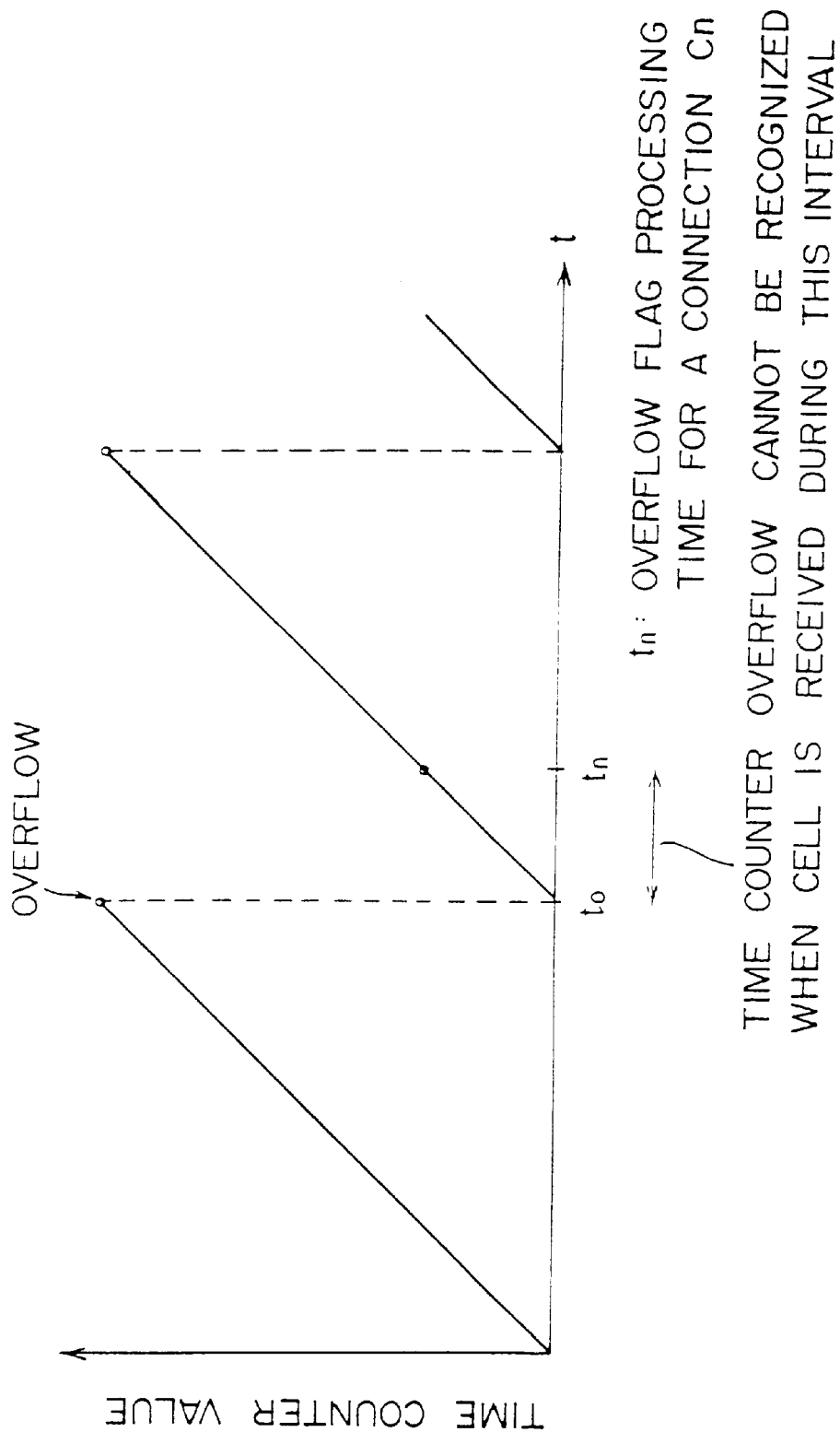
FIG. 1 is a diagram for use in explanation of problems with a conventional technique.
Figure 2:
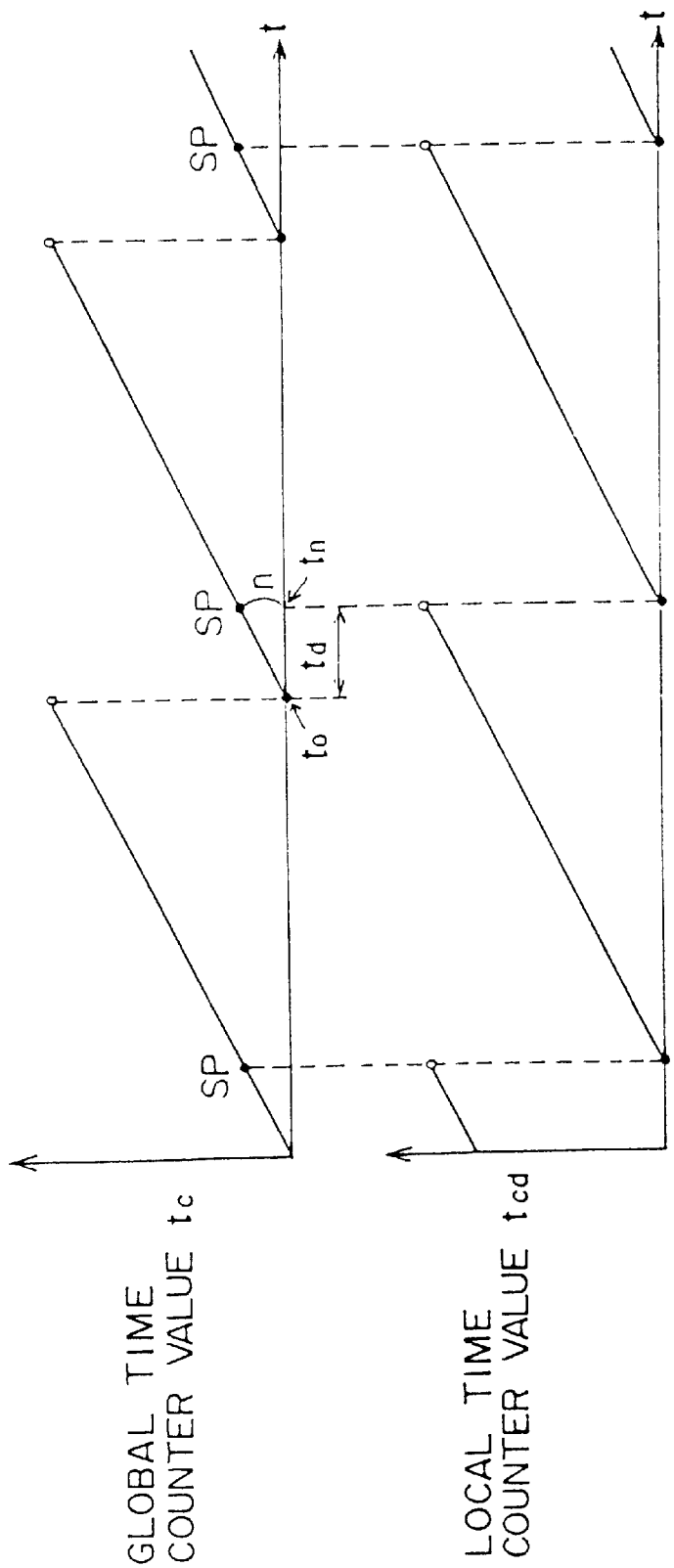
FIG. 2 is a diagram for use in explanation of the basic principles of the invention.

FIG. 2 illustrates the basic principles described above.

The timing of updating the overflow flag for connection $c_n$ is indicated as point SP. The counter value $t_{cd}$ obtained by subtracting the cell identification number n for the connection $c_n$ from the global time counter value $t_c$ is defined as the local time counter value for the connection $c_n$. As a result, it is only required to update the overflow flag for the connection $c_n$ at the time tn (the time corresponding to the SP point for the connection $c_n$) when the global time count value $t_c$ reaches n after the lapse of the time $t_d$ from the time at which the global time counter value overflows. The time of receiving a cell for the connection $c_n$ is detected as the local time counter value $t_{cd}$ obtained by subtracting the cell identification number n for the connection $c_n$ from the global time counter value $t_c$ at that time.

When multiple UPC parameters or NPC parameters are defined for one connection, a local time counter value may be defined for each parameter (processing algorithm unit). The principles of the preferred embodiments based on the LB algorithm In the LB (Leaky Bucket) algorithm, a leaky bucket counter for storing the history of cell flow is used to make a conformity/nonconformity determination for the next incoming cell. Specifically, whenever a cell is received, the cell interval which is the difference between the time the current cell is received and the time the previous cell was received is calculated, and the count in the leaky bucket counter is decremented by the cell interval value calculated and then supplemented with a given value. In this case, the local time counter value $t_{cd}$ corresponding to each connection $c_n$ is used to calculate the cell interval for each connection $c_n$, which will necessitate a process of updating the overflow flag for the local time counter value $t_{cd}$.

The local time counter value $t_{cd}$ and the cell interval are each of a limited length. Thus, a limitlessly long time interval cannot be calculated. For this reason, if a cell is received after a time interval that is so long as to make calculations impossible, it will be required to decide that the received cell is conformable.

Figure 3:
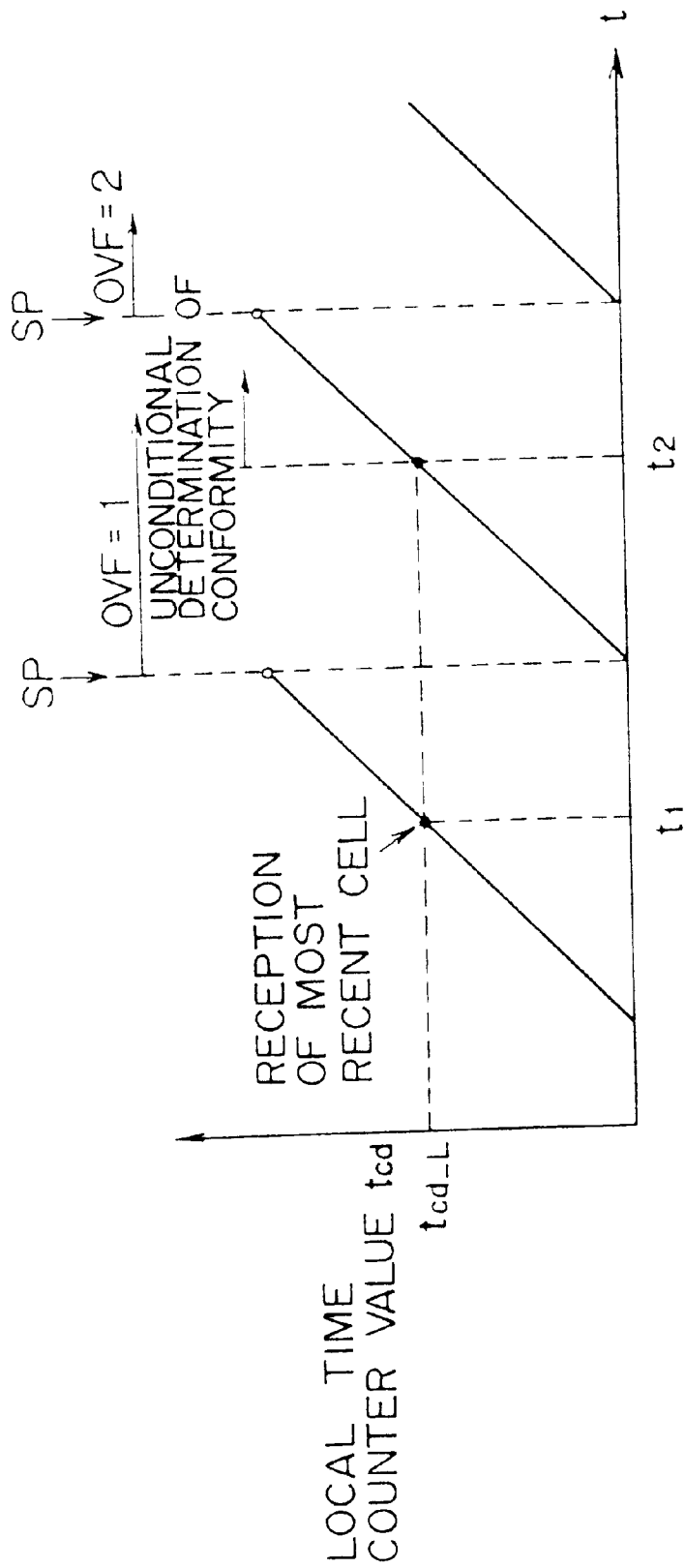
FIG. 3 is a diagram for use in explanation of the principles of an embodiment based on the LB algorithm.

In the embodiments associated with the LB method, the overflow flag OVF can take a value of 0 (no occurrence of overflow), 1 (one occurrence of overflow), or 2 (two occurrences of overflow). It is assumed that the cell interval is set equal in bit length to the local time counter value $t_{cd}$. Thus, in the example of FIG. 3, a calculatable range of the cell interval is from time $t_1$ to time $t_2$. When the following conditions 1 or 2 are met, it is decided that an incoming cell is conformable.

Conditions 1

Overflow flag OVF=1 and, the local time counter value tcd for the current incoming cell>the local time counter value $t_{cd-L}$ for the most recent incoming cell Condition 2

Overflow flag OVF=2

When none of the conditions 1 and 2 are met, the cell interval is calculated on the basis of the local time counter value $t_{cd}$ for the current incoming cell, the local time counter value $t_{cd-L}$ for the most recent incoming cell, and the value of the overflow flag OVF and then a conformity/nonconformity determination is made for the incoming cell on the basis of the LB algorithm.

The principles of a first embodiment associated with the VS algorithm A feature of the VS (virtual scheduling) algorithm is that, at a point of time a cell is received, the time when the next cell will be received is predicted. Thus, a processing problem arises when the predicted time exceeds the bit length of the local time counter value $t_{cd}$.

Figure 4:
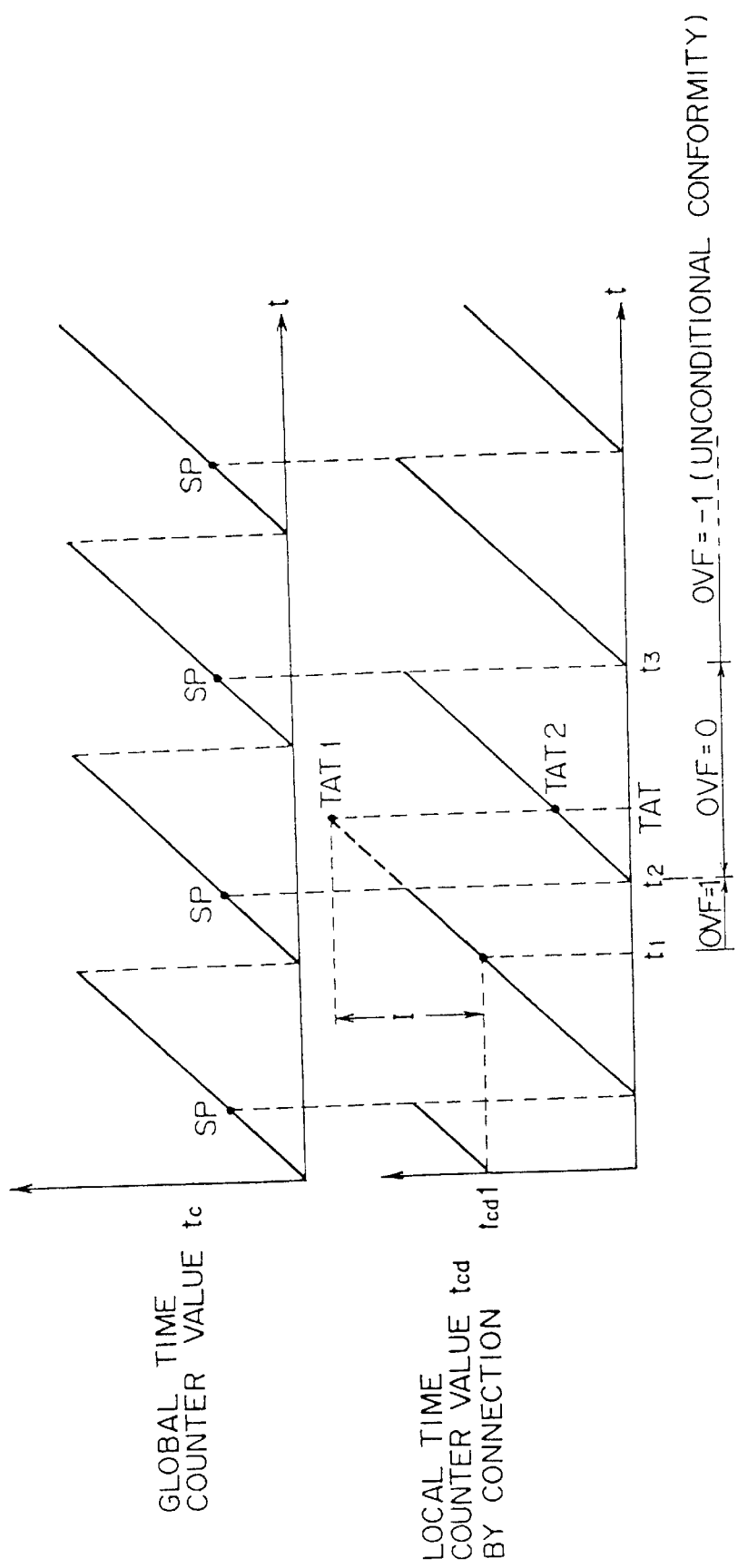
FIG. 4 is a diagram for use in explanation of the principles of the first embodiment based on the VS algorithm.

To solve this problem, the overflow flag OVF is used in the first embodiment for the VS method as well. FIG. 4 is a diagram for use in explanation of the principles of the first embodiment.

For connection $c_n$, when a cell is received at time $t=t_1$, i.e., when the local time counter value $t_{cd}$ for the connection $c_n$ is $t_{cd}=t_{cd1}$, the predicted time TAT (theoretical arrival time) for the next incoming cell for the connection $c_n$ is calculated by $$TAT=t_{cd1}+I$$

where I, an increment parameter associated with the VS algorithm, is an addend that represents a previously defined cell interval. When the result of this operation exceeds the bit length of the local time counter value $t_{cd}$ a one is set in the overflow flag OVF for the connection $c_n$ stored in the memory; otherwise, a zero is set in that overflow flag OVF. Note here that the addened I is set so that the result of the above operation will not become two or more bits longer than the bit length of the local time counter value $t_{cd}$.

At the time the local time counter value $t_{cd}$ for the connection $c_n$ causes overflow, i.e., at the time the global time counter value $t_c$ reaches the value corresponding to the SP point for the connection $c_n$, the overflow flag OVF set up for the connection $c_n$ in the memory is reset to zero.

Suppose here that the overflow flag OVF doubles as the most significant bit of the predicted time TAT for the next incoming cell. Then, in FIG. 4, TAT=TAT1 results in the range of $t_1<t<t_2$ and TAT=TAT2 in the range of $t_2<t$. TAT1 and TAT2 indicate the same time. Next, at the time a cell for the connection $c_n$ is received, a comparison is made between the local time counter value $t_{cd}$ for the connection $c_n$ at that time and the predicted time for the next incoming cell for the connection $c_n$ to thereby make a conformity/nonconformity determination for that incoming cell. In this manner, the inconvenience due to the limited bit length of the local time counter value $t_{cd}$ is eliminated.

In FIG. 4, on the assumption that no cell will be received over a sufficiently long time after the time $t_3$, it is necessary to decide that the subsequent incoming cell is conformable. To this end, the overflow flag OVF set up in the memory for the connection $c_n$ is set to −1 at the time when, in the sate where OVF=0, the local time counter value $t_{cd}$ for the connection $c_n$ causes overflow (at the time the global time counter value $t_c$ reaches the value corresponding to the SP point for the connection $c_n$). If OVF=−1 at the time when a cell for the connection $c_n$ is received, then it is decided that the cell is conformable.

The principles of a second embodiment associated with the VS algorithm

Figure 5:
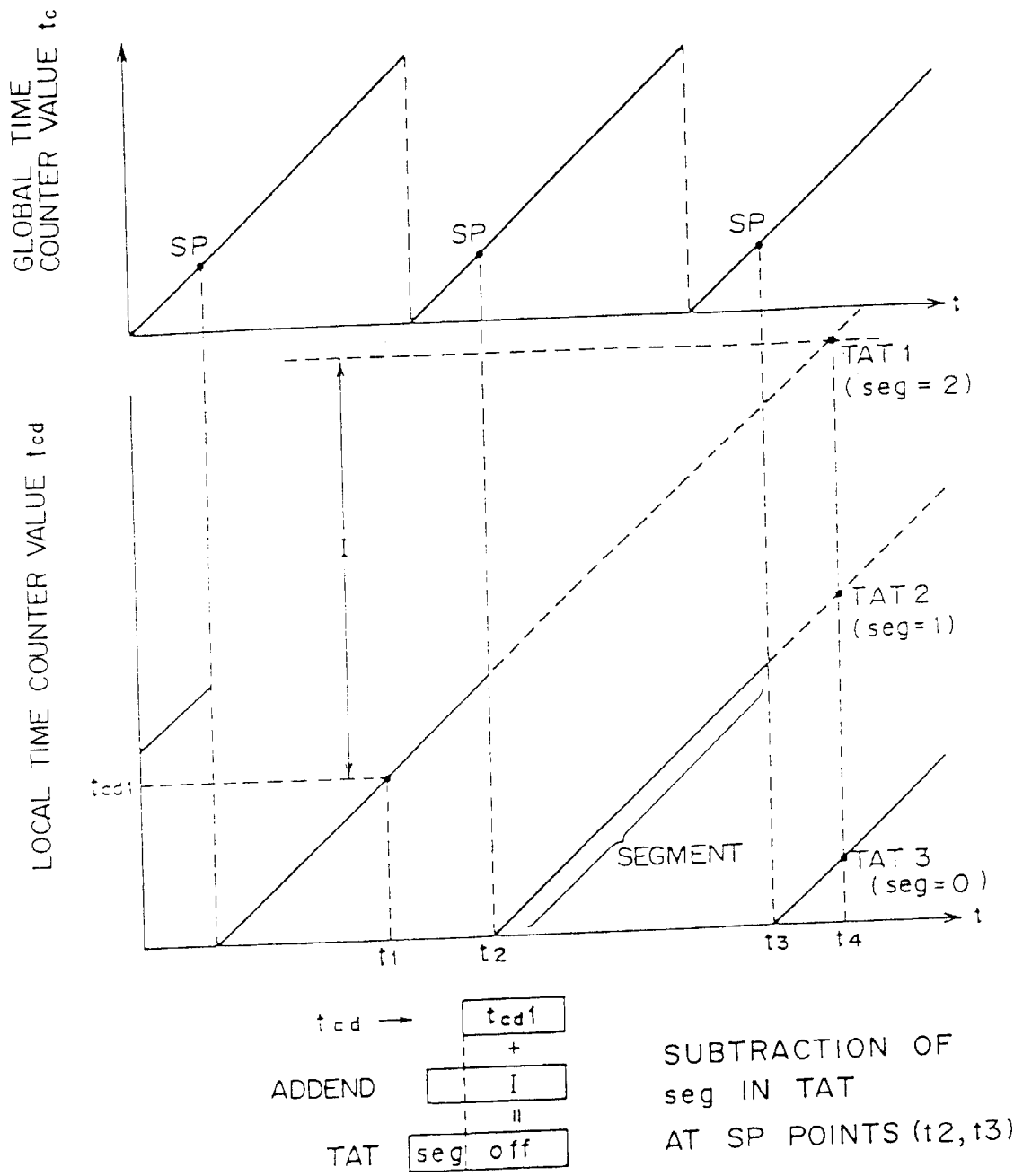
FIG. 5 is a diagram for use in explanation of the principles of the second embodiment based on the VS algorithm.

In the second embodiment, the overflow flag OVF used in the first embodiment is extended to multiple bits. The extended overflow flag OVF is referred to as "seg" in this embodiment. By this seg, the number of times the local time counter value $t_{cd}$ will overflow in the time interval from the current time at which a cell is being received to the predicted time TAT for the next incoming cell is managed. FIG. 5 illustrates the principles of the second embodiment associated with the VS algorithm.

As with the first embodiment shown in FIG. 4, when a cell is received at time $t=t_c$, i.e., at the time when the local time counter value $t_{cd}$ for the connection $c_n$ is equal to $t_{cd1}$, the predicted time TAT for the next incoming cell for the connection $c_n$ is calculated by $$TAT=t_{cd1}+I$$

The result of this operation is preserved as data having more bits than the local time counter value $t_{cd}$. Of a bit string for the predicted time TAT for the next incoming cell, a string, seg, of high-order bits other than low-order bits corresponding in bit length to the local time counter value $t_{cd}$ indicates the number of times the local time counter value $t_{cd}$ will overflow in the time interval from the current time to the predicted time TAT for the next incoming cell.

Each time the local time counter value $t_{cd}$ for the connection $c_n$ overflows, i.e., each time the global time counter value $t_c$ reaches the value corresponding to the SP point for the connection $c_n$, the high-order bit string seg of the predicted time TAT for the next incoming cell set up in the memory for the connection $c_n$ is decremented by one, producing a new high-order bit string seg.

By such an arrangement, as shown in FIG. 5, the predicted time for the next incoming cell will be seen on the extension of the segment that the local time counter value $t_{cd}$ indicates at times after time $t_1$. Specifically, TAT=TAT1 in the range of $t_1<t<t_2$, TAT=TAT2 in the range of $t_2<t<t_3$, and TAT=TAT3 in the range of $t_3<t$. TAT1, TAT2 and TAT3 all indicate the same time $t_4$ indicated by the predicted time for the next incoming cell. At the time when the next cell is received, a comparison is made between the local time counter value $t_{cd}$ for the connection $c_n$ at that time and the predicted time for the next incoming cell TAT for the connection $c_n$ to thereby make a conformity/nonconformity determination for the incoming cell.

In this embodiment, the local time counter value $t_{cd}$ for the connection $c_n$ is used for timing control (SP point management) for manipulating the high-order bit string seg of the predicted time for the next incoming cell for the connection $c_n$ rather than for indicating time. For this reason, the global time counter value $t_c$ and the local time counter value $t_{cd}$ are no longer required to have a bit length corresponding to the cell interval and hence are allowed to be shorter in bit length. This also means that an operation circuit which calculates the local time counter value $t_{cd}$ from the global time counter value $t_c$ can be reduced in scale. Those counter values are merely required to have such a bit length as only permits the number of connections to be processed in parallel to be counted.

If no cell is received after time $t_4$ and the local time counter value $t_{cd}$ overflows again, then the high-order bit string seg (value 0) of the predicted time for the next incoming cell is decremented by one, so that the value of the high-order bit string seg becomes negative and the predicted time TAT itself for the next incoming cell containing that bit string takes a negative value. In this case, it is considered that no cell will be received over a sufficiently long time and hence it is decided that the subsequent incoming cell is conformable.

The principles of a third embodiment associated with the VS algorithm

With the VS algorithm, the addend I used in calculating the predicted time TAT for the next incoming cell may be represented in floating-point notation so as to increase the precision of the UPC or NPC function. In this case, the predicted time TAT will also be represented in floating-point notation. If, however, the predicted time TAT is represented in floating-point notation in the above-described second embodiment for the VS algorithm, the local time counter value $t_{cd}$ and the number of occurrences of overflow cannot be simply separated from each other by bit position.

In the third embodiment for the VS algorithm, therefore, the predicted time TAT for the next incoming cell is calculated in floating-point notation to be TAT=$t_{cd1}$+I. And each time the local time counter value $t_{cd}$ for the connection $c_n$ overflows, i.e., each time the global time counter value $t_c$ reaches the value corresponding to the SP point for the connection $c_n$, the expressive maximum value, $t_{cdn}$+1, of the local time counter value $t_{cd}$ is subtracted from the predicted time TAT for the next incoming cell set in the memory for the connection $c_n$ to obtain a new predicted time TAT as follows:

$$TAT_n = TAT_{n-1} - (t_{cdn}+1)$$

Figure 6:
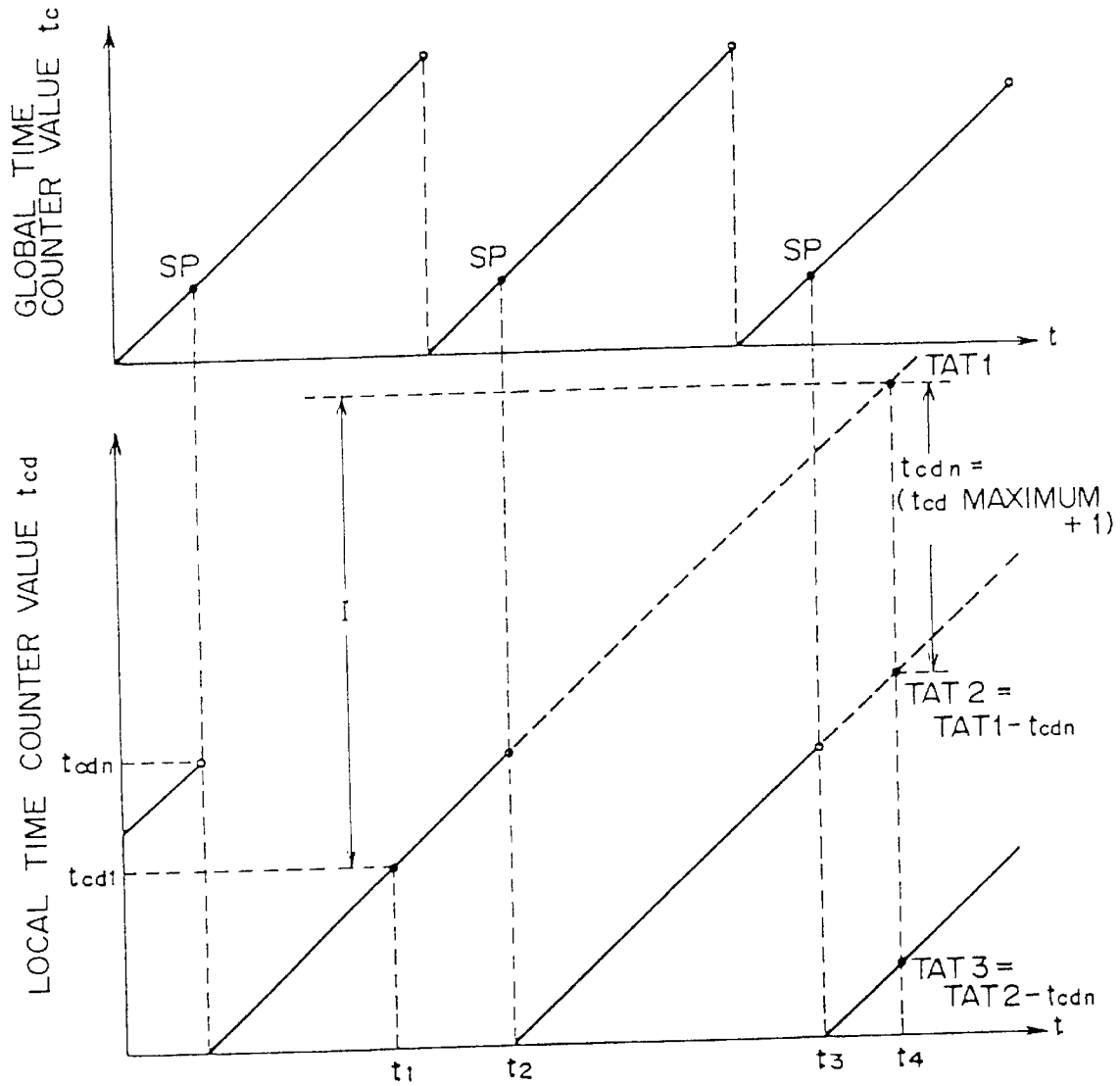
FIG. 6 is a diagram for use in explanation of the principles of the third embodiment based on the VS algorithm.

By such an arrangement, as shown in FIG. 6, the predicted time TAT2 for the next incoming cell is calculated to be TAT2=TAT1-$t_{cdn}$ at time $t_2$, and TAT3 is calculated to be TAT3=TAT2-$t_{cdn}$ at time $t_3$. As with the second embodiment, in this case, the predicted times TAT1, TAT2 and TAT3 all indicate the same time $t_4$. Then, at the time when a cell for the connection $c_n$ is received, a comparison is made between the local time counter value $t_{cd}$ for the connection $c_n$ at that time and the predicted time TAT for the next incoming cell for the connection $c_n$ to thereby make a conformity/nonconformity determination for the incoming cell.

If no cell is received after time $t_4$ and the local time counter value $t_{cd}$ overflows again, then the expressive maximum value, $t_{cdn}$+1, of the local time counter value $t_{cd}$ is subtracted from the predicted time TAT for the next incoming cell, so that the predicted time TAT for the next incoming cell takes a negative value. In this case, as with the second embodiment, it is considered that no cell will be received over a sufficiently long time and hence it is decided that the subsequent incoming cell is conformable.

Hereinafter, the preferred embodiments based on the above-described principles will be described in detail.

Figure 7:
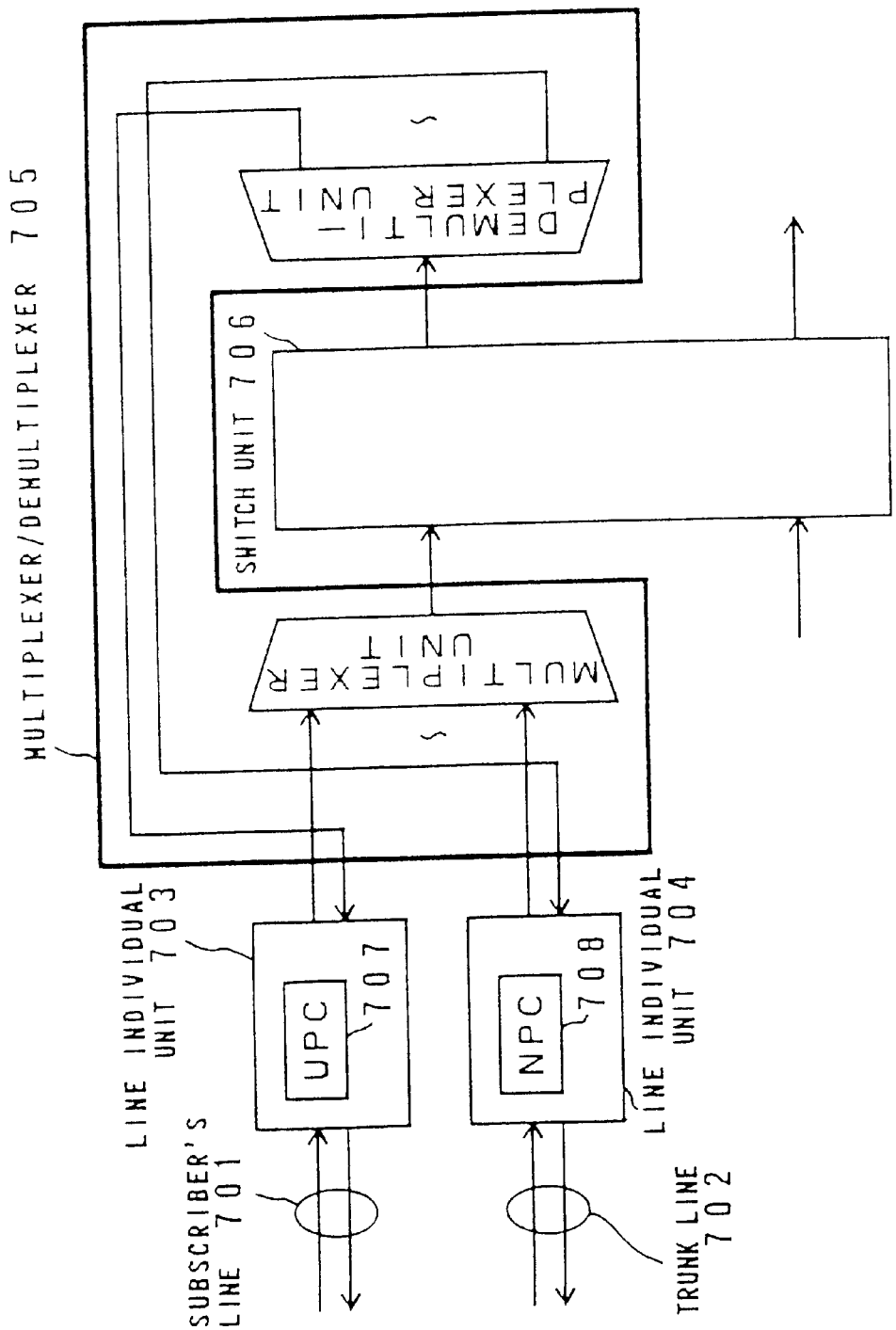
FIG. 7 shows an arrangement of an ATM switching unit common to the embodiments of the invention.

Arrangement common to the embodiments FIG. 7 shows an arrangement of an ATM switching unit common to the embodiments. A subscriber's line 701 and a trunk line 702 are respectively terminated by line individual units 703 and 704 which are connected through a multiplexer and demultiplexer in a multiplexer/demultiplexer unit 705 to a switching unit 706. A UPC function unit 707 is installed on paths of the up line (in the direction from the subscriber's line 701 to the switching unit 706) in the line individual unit 703 that terminates the subscriber's line 701, while an NPC function unit 708 is installed on paths of the up line (in the direction from the trunk line 702 to the switching unit 706) in the line individual unit 704 that terminates the trunk line 702.

Figure 8:
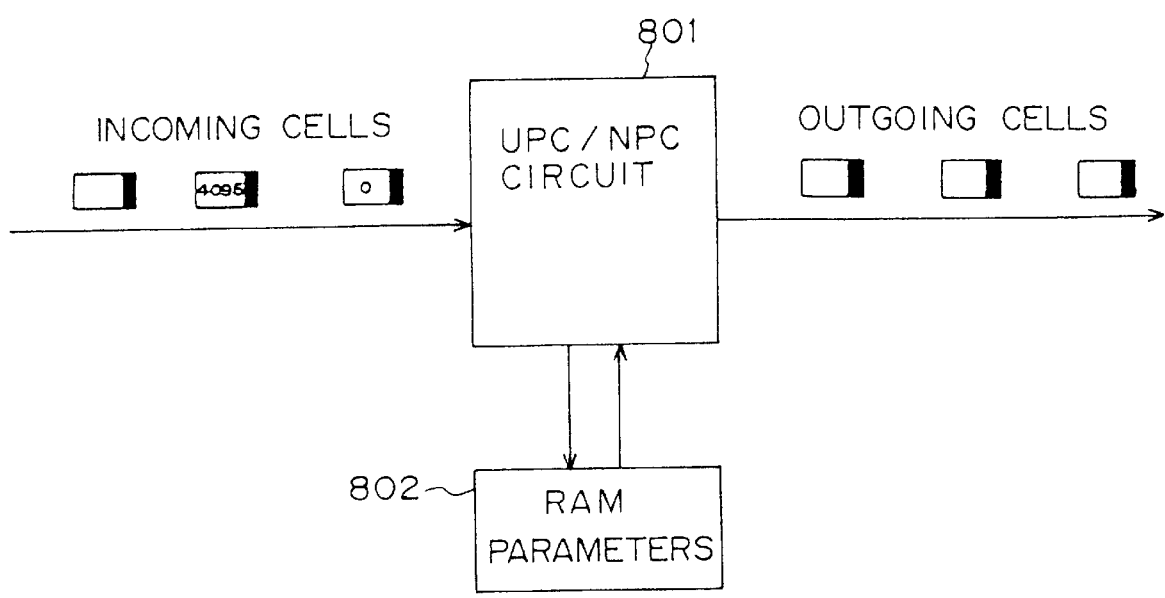
FIG. 8 shows an arrangement of the UPC and NPC functional sections in FIG. 7.

FIG. 8 shows an arrangement of the UPC function unit 707 or NPC function unit 708 of FIG. 7. A UPC/NPC circuit 801 manipulates or references various parameters for the LB or VS algorithm stored in a RAM 802 to thereby implement the UPC function or the NPC function.

Figure 9:
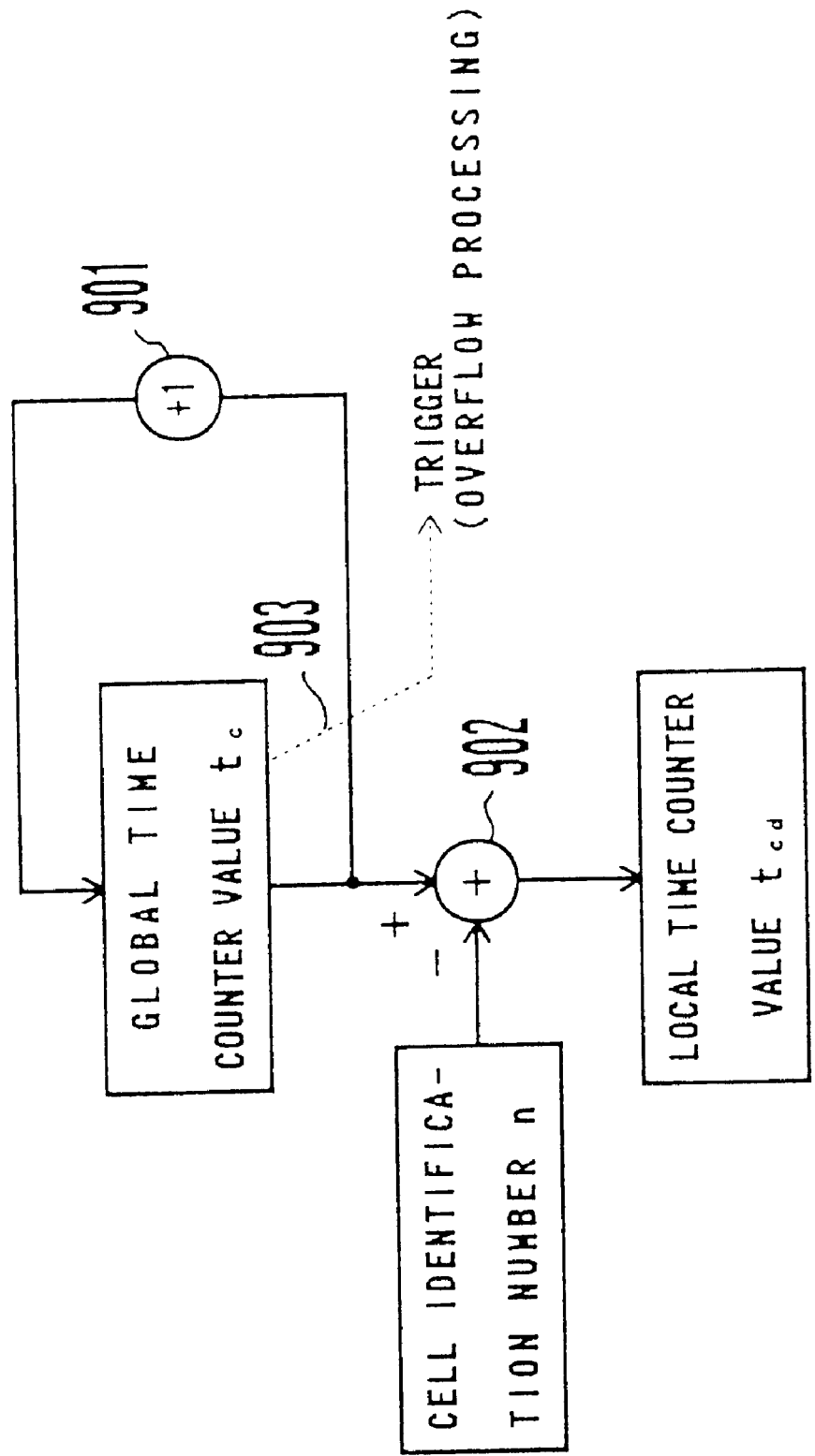
FIG. 9 is a basic operational flowchart for calculation of a local time counter value $t_{cd}$ from a global time counter value $t_c$ in the embodiments of the invention.

FIG. 9 is a basic operational flowchart for calculating a local time counter value $t_{cd}$ for each connection $c_n$ from the global time counter value $t_c$ in each of the embodiments.

Assuming that the subscriber's line 701 or the trunk line 702 of FIG. 7 has a 155.52-MHz interface and the cell length on the line is 53 octets, the cell time taken to receive one cell will be about 2.7 microseconds. The count $t_c$ in the global time counter is incremented by one every 2.7 microseconds (each time one cell is received). Upon counting up to a count that permits the cell interval to be measured, the global time counter causes overflow and returns to 0 (step 901 in FIG. 9).

On the other hand, as described in connection with the basic principles of the preferred embodiments, the local time counter value $t_{cd}$ for connection $c_n$ is defined as a counter value obtained by subtracting the cell identification number n for connection $c_n$ from the global time counter value $t_c$ (step 902 in FIG. 9). This subtraction is implemented by addition of the global time counter value $t_c$ to a number (two's complement of the cell identification number) obtained by adding one to a string of bits each of which is the inverse of a corresponding respective one of bits in the cell identification number data. The subtraction is performed at a time within the cell time it takes for a cell corresponding to connection $c_n$ to flow into the UPC/NPC circuit 801 of FIG. 8.

As is also described above in connection with the basic principles of the embodiments, the local time counter value $t_{cd}$ corresponding to connection $c_n$ definitely overflows at the time when the global time counter value $t_c$ reaches the cell identification number n corresponding to that connection $c_n$. Thus, the event that the global time counter value $t_c$ reaches the cell identification number n for the connection $c_n$ triggers overflow processing (updating the overflow flag OVF, updating the high-order bit string seg of the predicted time TAT for the next incoming cell, etc.) for the connection $c_n$ (step 903 in FIG. 9).

Figure 10:
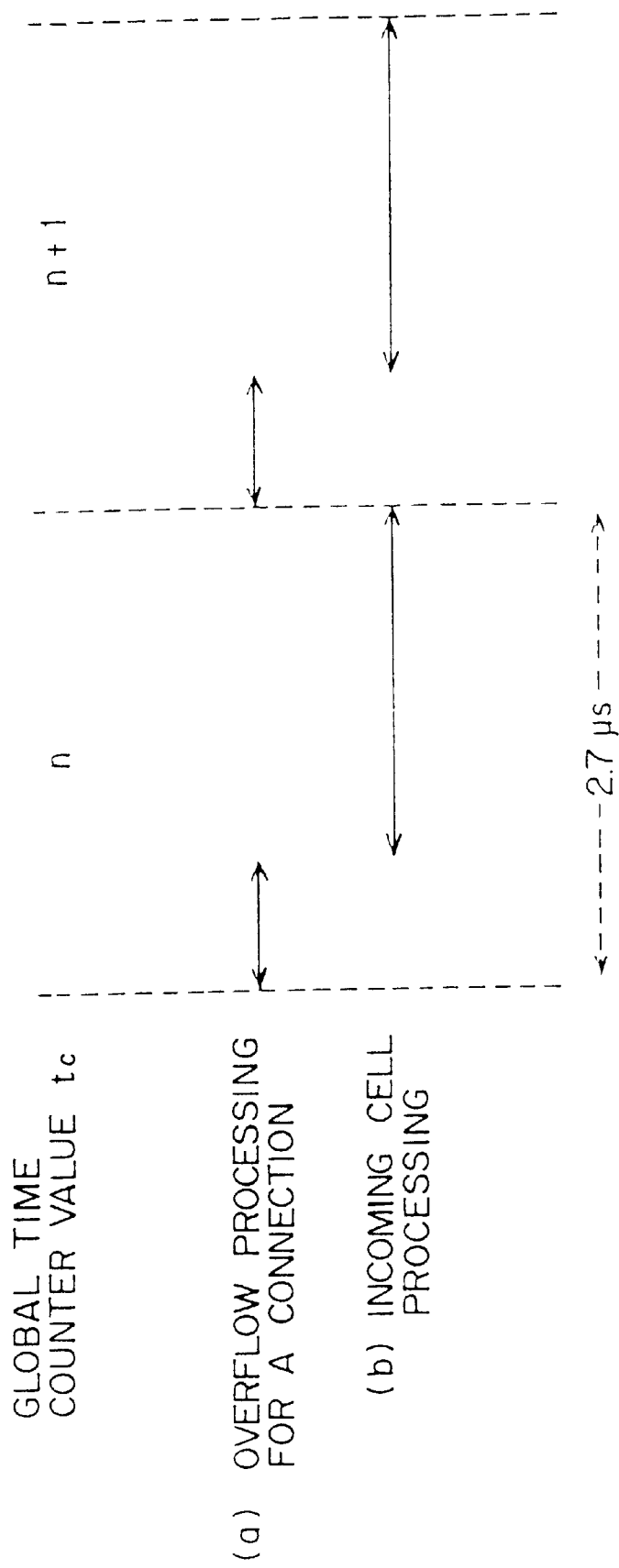
FIG. 10 shows a relationship between overflow processing times and incoming cell processing times for each connection in the embodiments of the invention.

In this case, in each cell time during which the global time counter value $t_c$ assumes a value, overflow processing for a connection corresponding to that counter value is carried out in a first-half fixed period of the cell time as shown in FIG. 10(a) and processing for a cell that is currently being received (UPC processing, NPC processing, VPI/VCI replacement processing, tag attachment processing, etc.) is carried out in the second-half fixed period immediately after the first-half fixed period as shown in FIG. 10(b). That is, in the first-half period of the cell time in which global time counter value $t_c=n$, overflow processing for the connection $c_n$ is carried out and, in the second-half period, processing for a currently received cell associated with any connection is carried out. Also, in the cell time in which global time counter value $t_c=n+1$, overflow processing for connection $c_{n+1}$ is carried out in the first-half period of the cell time and processing for a currently received cell which may be associated with any connection is carried out in the second-half period. Therefore, even if, in a cell time that contains a time when the local time counter value $t_{cd}$ for one connection just overflows, a cell for that connection is received, the overflow processing for that connection is carried out in the first-half period of that cell time and then the processing for that cell is carried out in the second-half period. Consequently, the suitable UPC or NPC function will be performed properly for that connection.

Arrangement of the embodiments associated with the LB algorithm

Figure 11:
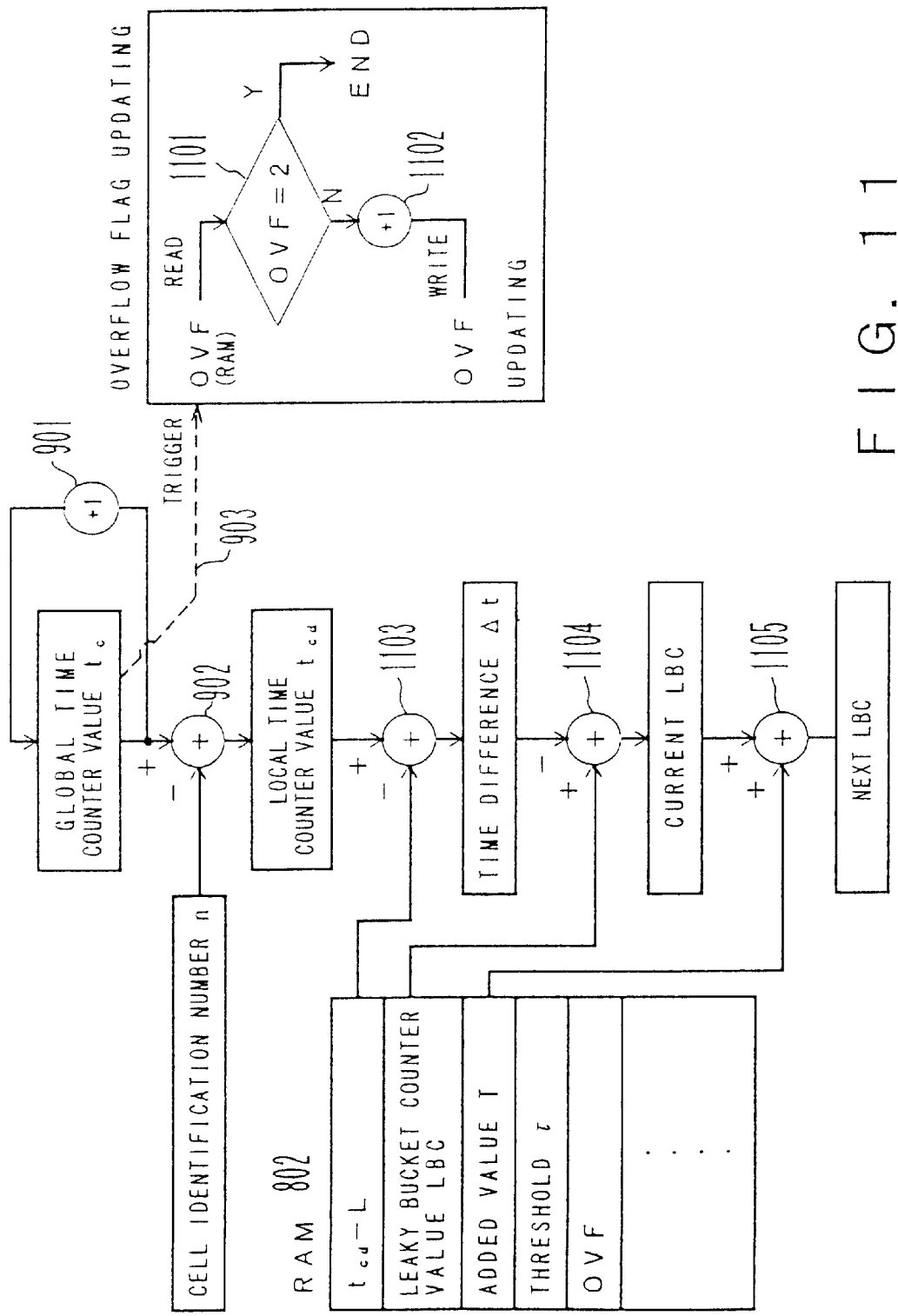
FIG. 11 is the first operational flowchart for the embodiment based on the LB algorithm.
Figure 12:
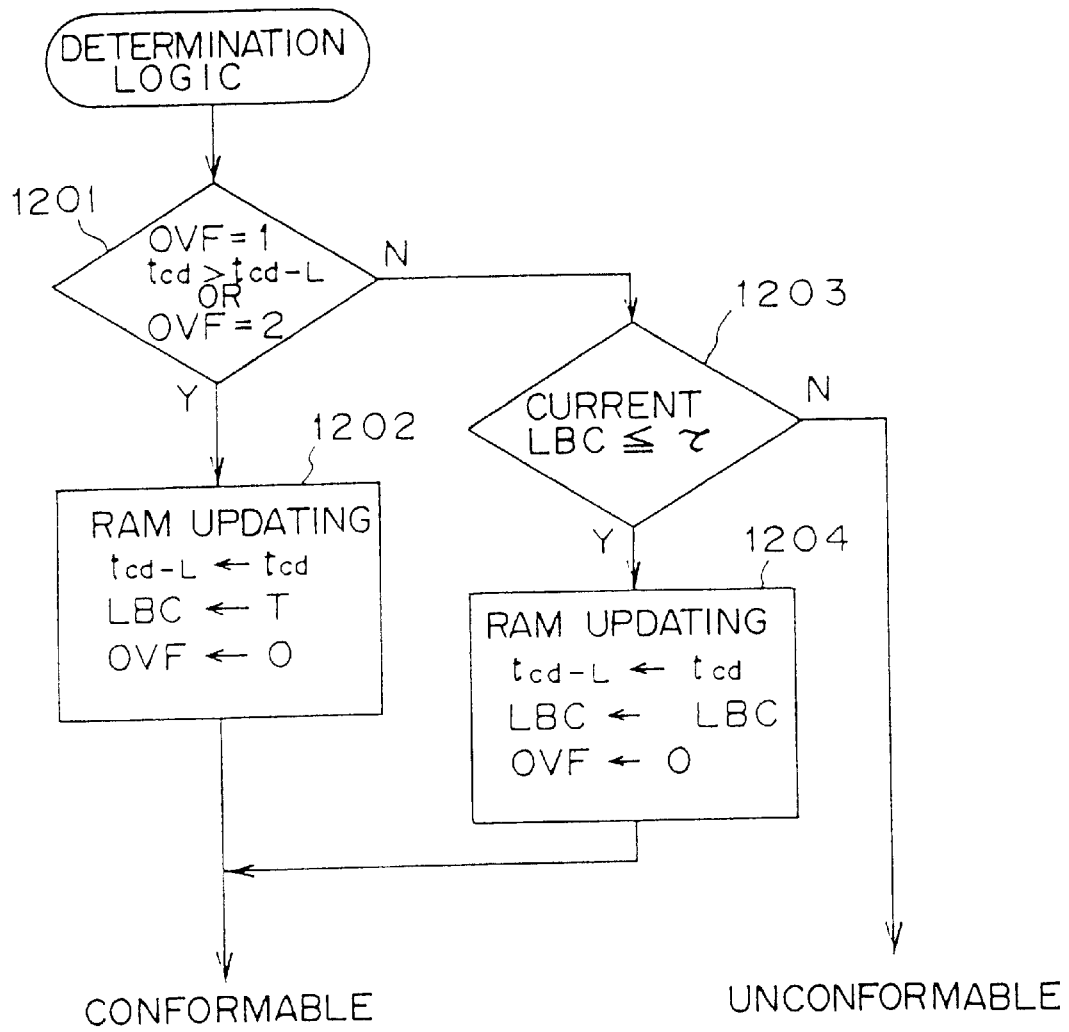
FIG. 12 is the second operational flowchart for the embodiment based on the LB algorithm.
Figure 13:
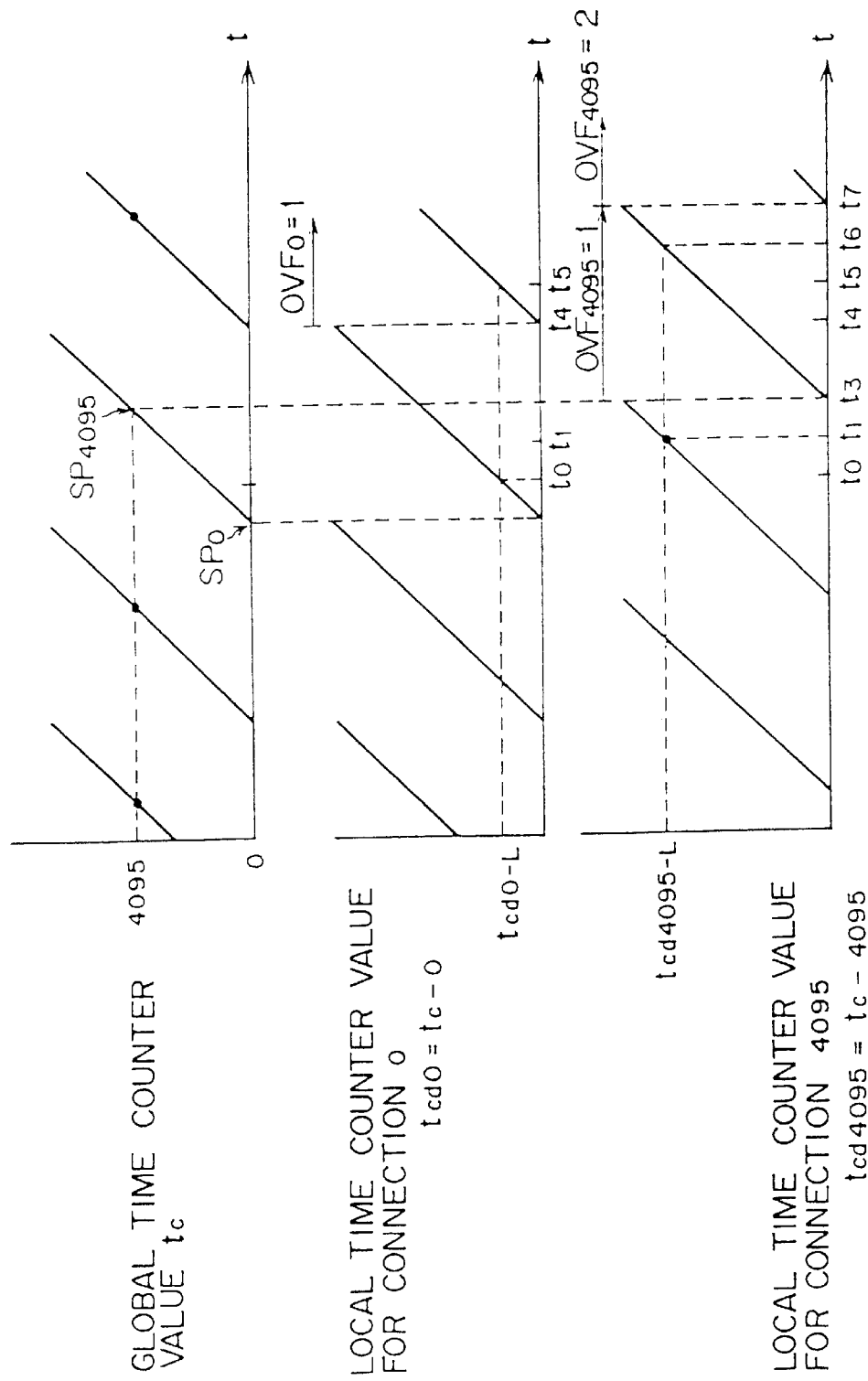
FIG. 13 is a diagram for use in explanation of the embodiments based on the LB algorithm.

FIGS. 11 and 12 are operational flowcharts for the UPC or NPC function that the UPC/NPC circuit 801 of FIG. 8 carries out, and FIG. 13 is a diagram explanatory of the operation of the present embodiments.

In the RAM 802 of FIG. 8, such various parameters as shown in FIG. 11 are stored. As described previously, the overflow flag OVF can take a value of 0 (no occurrence of overflow), 1 (one occurrence of overflow), or 2 (two occurrences of overflow). Suppose that the bit length of the cell interval $\Delta t$ (to be described later) is set identical to the bit length of the local time counter value $t_{cd}$ (=the bit length of the global time counter value $t_c$).

In the flowchart of FIG. 11, steps 901, 902 and 903 are identical to steps 901, 902 and 903, respectively, of FIG. 9.

In this case, the event that the global time counter value $t_c$ becomes equal to the cell identification number n ($0 \leq n \leq 4095$) for one connection $c_n$ triggers (step 903) a process of updating the overflow flag OVF for that connection (steps 1101 and 1102) in the first-half period of the current cell time (FIG. 10(a)). In the example of FIG. 13, for the connection $c_0$, this trigger occurs at the point of time $SP_0$ when the global time counter value tc reaches the cell identification number 0 and, for the connection $c_{4095}$, at the point of time $SP_{4095}$ when the global time counter value $t_c$ reaches the cell identification number 4095.

That is, on the occurrence of the trigger, the overflow flag OVF stored in that area in the RAM 802 which corresponds to the connection $c_n$ is first read out and then a determination is made as to whether or not the overflow flag value is 2 (step 1101 in FIG. 11).

If the overflow flag value is 0 or 1 and hence the result of the determination in step 1101 is NO, then a one is added to the overflow flag value (step 1102) and the result is rewritten into the RAM 802.

If, on the other hand, the overflow flag value is 2 and hence the determination in step 1101 is YES, then the overflow flag OVF is not updated.

In the example shown in FIG. 13, the overflow flag OVFO for connection $c_0$ is updated from 0 to 1 at time $t_4$. The overflow flag $OVF_{4095}$ for connection $c_{4095}$ is updated from 0 to 1 at time $t_3$ and from 1 to 2 at time $t_7$.

On the other hand, steps 902, 1103, 1104 and 1105 of FIG. 11 and a sequence of processes in the flowchart of FIG. 12 are carried out during the second-half period (see FIG. 10(b)) of the cell time during which a cell associated with an arbitrary connection $c_n$ flows into the UPC/NPC circuit 801 of FIG. 8.

First, the cell identification number n corresponding to the connection $c_n$ is subtracted from the global time counter value $t_c$ to thereby calculate the local time counter value $t_{cd}$ corresponding to the connection $c_n$ with which the currently received cell is associated (step 902 in FIG. 11).

Next, the local time counter value $t_{cd-L}$ for the most recently received cell which is stored in that area in the RAM 802 which corresponds to that connection $c_n$ is subtracted from the local time counter value $t_{cd}$ for the currently received cell to thereby calculate the cell interval t (step 1103 in FIG. 11). In the example of FIG. 13, the local time counter value of the most recently received cell for connection $c_0$ is $t_{cd0-L}$ at time $t_0$. In the case of the connection $c_{4095}$, the local time counter value is $t_{cd4095-L}$ at time $t_1$.

Moreover, the cell interval $\Delta t$ is subtracted from the count LBC in the leaky bucket counter stored in the area of the RAM 802 corresponding to the connection $c_n$ to thereby calculate the current count LBC (the current LBC) in the leaky bucket counter (step 1104 in FIG. 11).

Furthermore, the value T stored in the area of the RAM 802 corresponding to the connection $c_n$ is added to the current LBC to thereby calculate the next leaky bucket counter value LBC (the next LBC) (step 1105 in FIG. 11).

Figure 14:
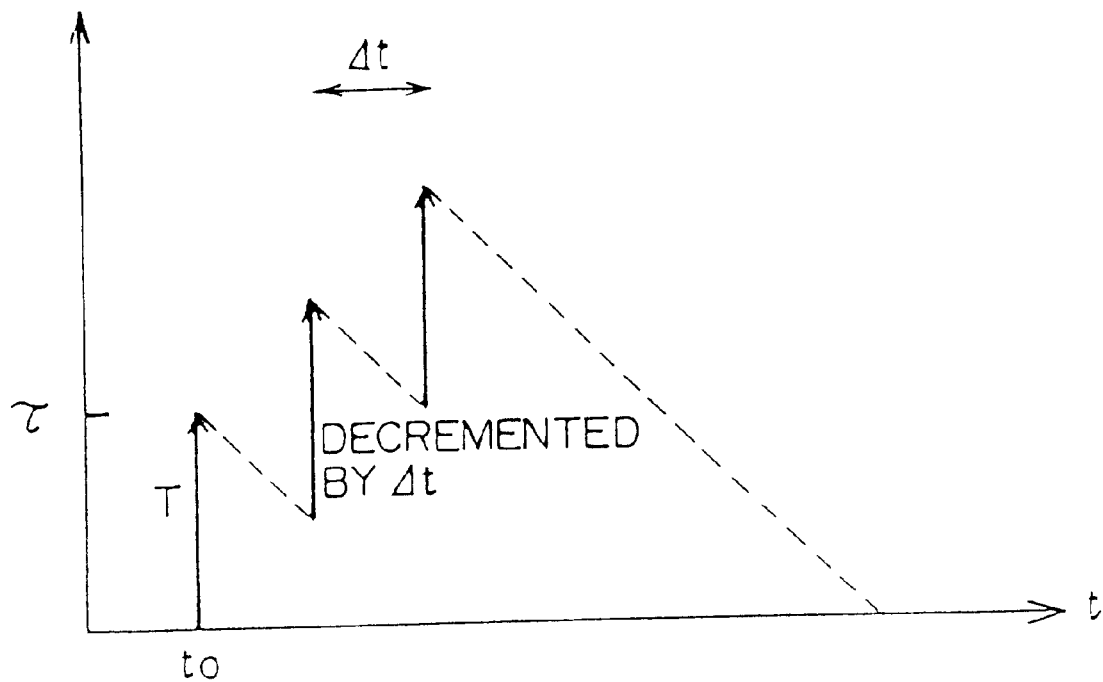
FIG. 14 is a diagram explanatory of the operation of the leaky bucket counter.

As a result of such a sequence of processes, the leaky bucket counter value LBC will change as shown in FIG. 14.

Subsequent to the sequence of processes, determination logic is implemented in the form of the flowchart of FIG. 12.

First, a determination is made as to whether or not the following conditions 1 or 2 are satisfied (step 1201).

Condition 1:

Overflow flag OVF=1 and, $t_{cd}$ (the local time counter value for the currently received cell)>$t_{cd-L}$ (the local time counter value for the most recently received cell)

Condition 2:

Overflow flag OVF=2

In the example of FIG. 13, for the connection $c_0$, the conditions 1 are satisfied at and after time $t_5$. For the connection $c_{4095}$, the conditions 1 are satisfied at and after time $t_6$. The condition 2 is satisfied at and after $t_7$ for the connection $c_{4095}$. On the other hand, none of the conditions 1 and 2 are satisfied before time $t_5$ for the connection $c_0$ and before time $t_6$ for the connection $c_{4095}$.

If the conditions 1 or 2 are satisfied (Yes in step 1201), then it is decided that the current cell is conformable. Thus, in the respective corresponding areas of the RAM 802 there are stored the local time counter value $t_{cd}$ for the current cell as a local time counter value $t_{cd-L}$ for the most recently received cell, the addend T stored in the area corresponding to the connection $c_n$ as a new leaky bucket counter value LBC, and a 0 as a new value of the overflow flag OVF (step 1202).

If none of the conditions 1 and 2 are satisfied (NO in step 1201), then a determination is made in step 1203 as to whether or not the current LBC calculated in step 1104 in FIG. 11 is not greater than a threshold τ stored in the area in the RAM 802 that corresponds to the connection $c_n$ (see FIG. 14).

If the current LBC is not greater than the threshold τ (YES in step 1203), then it is determined that the current cell is conformable. Thus, in the respective corresponding areas of the RAM 802 there are stored the local time counter value $t_{cd}$ for the current cell as a local time counter value $t_{cd-L}$ for the most recently received cell, the next LBC calculated in step 1105 in FIG. 11 as a new leaky bucket counter value LBC, and a 0 as a new value of the overflow flag OVF (step 1204).

If the current LBC is greater than the threshold (NO in step 1203), then it is decided that the currently received cell is not conformable.

Arrangement of the first embodiment associated with the VS algorithm

Figure 16:
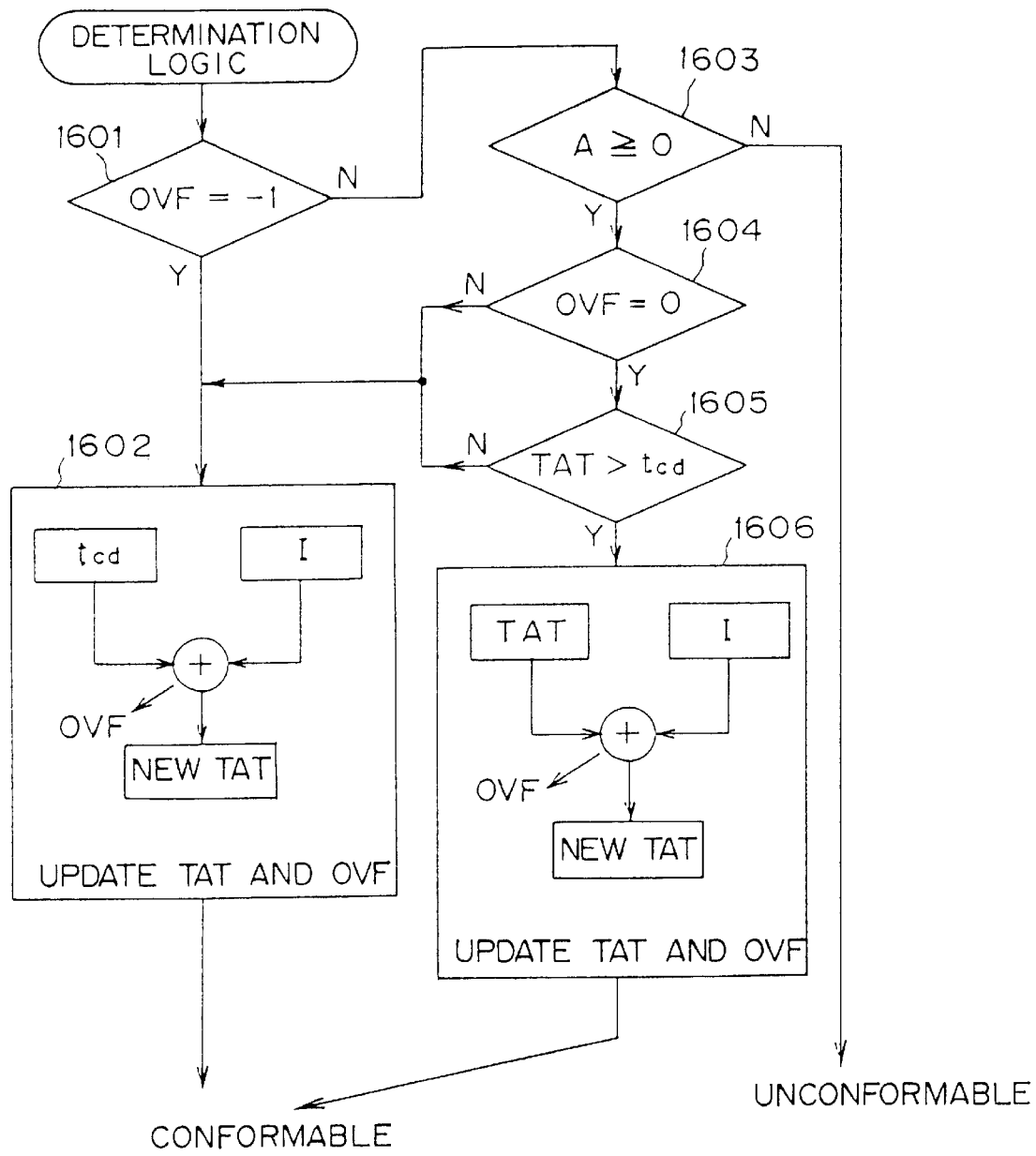
FIG. 16 is the second operational flowchart of the first embodiment based on the VS algorithm.
Figure 17:
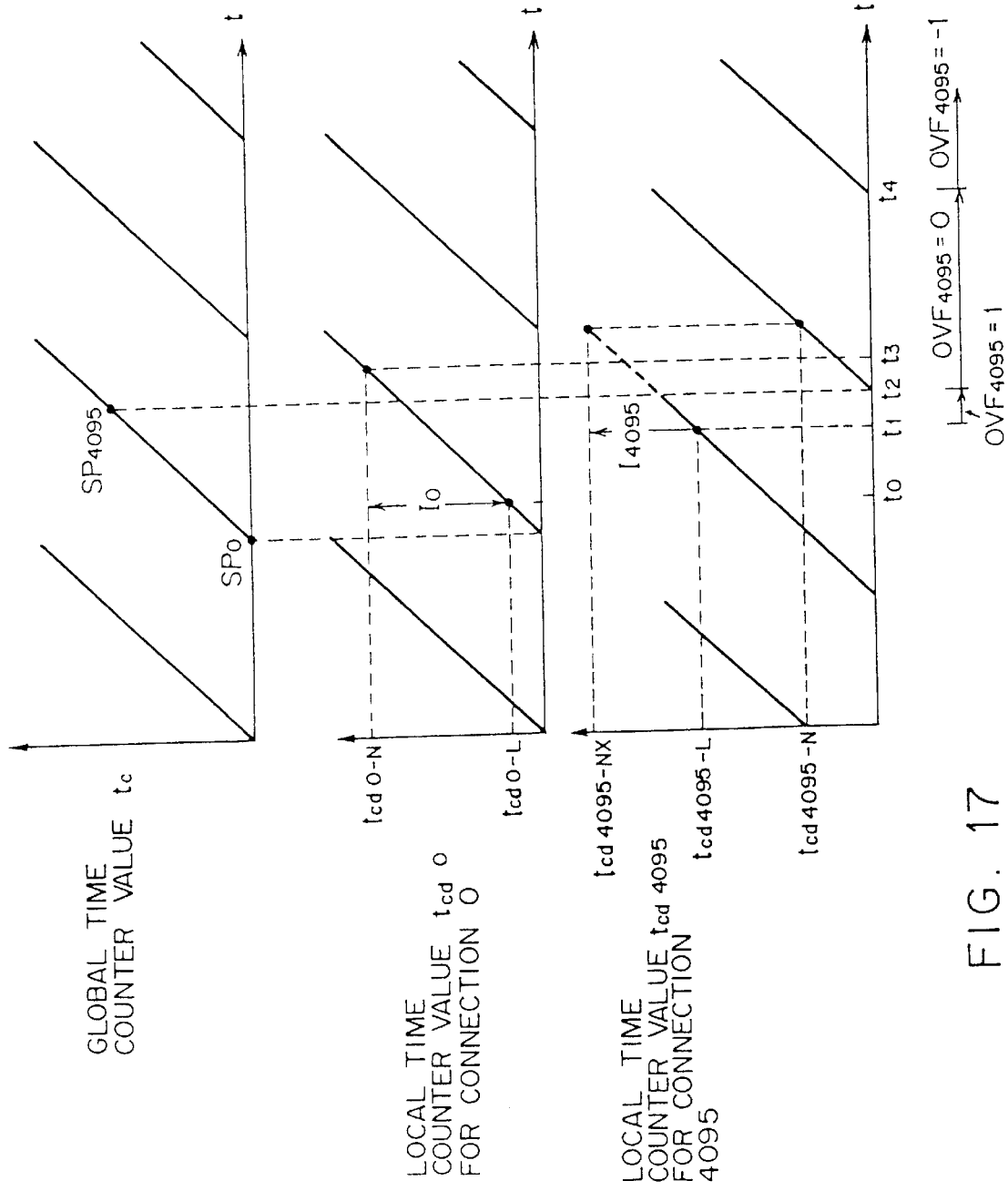
FIG. 17 is the first diagram explanatory of the operation of the first embodiment based on the VS algorithm.
Figure 18:
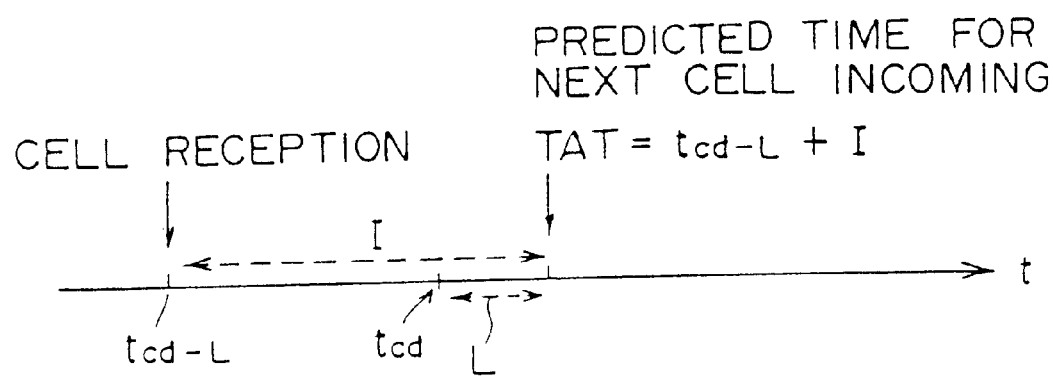
FIG. 18 is the second diagram explanatory of the operation of the first embodiment based on the VS algorithm.

FIGS. 15 and 16 are operational flowcharts for the UPC or NPC function that the UPC/NPC circuit 801 of FIG. 8 carries out in the first embodiment for the VS algorithm, and FIGS. 17 and 18 are diagrams explanatory of the operation of the present embodiment.

In the RAM 802 of FIG. 8 such various parameters as shown in FIG. 15 are stored.

First, in the flowchart of FIG. 15, steps 901, 902 and 903 are the same as steps 901, 902 and 903, respectively, of FIG. 9.

In this case, the event that the global time counter value $t_c$ becomes equal to the cell identification number n (0<n<4095) for one connection $c_n$ triggers (step 903) a process of updating the overflow flag OVF for that connection (steps 1101 and 1102) in the first-half period of the current cell time (FIG. 10(a)). In the example of FIG. 17, for the connection $c_0$, this trigger occurs at the point of time $SP_0$ when the global time counter value $t_c$ reaches the cell identification number 0 and, for the connection $c_{4095}$, at the point of time $SP_{4095}$ (time $t_2$) when the global time counter value to reaches the cell identification number 4095.

That is, at the time of occurrence of the trigger, the overflow flag OVF stored in that area in the RAM 802 which corresponds to the connection $c_n$ is first read out and then a determination is made as to whether or not the overflow flag value is smaller than 0 (step 1501 in FIG. 15).

If the overflow flag value is 1 or 0 and hence the determination in step 1501 is NO, then a one is subtracted from the overflow flag value (step 1502) and the result is rewritten into the RAM 802.

If, on the other hand, the overflow flag value is −1 and hence the determination in step 1501 is YES, then the overflow flag OVF is not updated.

In the example of FIG. 17, the overflow flag $OVF_{4095}$ for connection $c_{4095}$ is updated from 1 to 0 at time $t_2$ and from 0 to −1 at time $t_4$.

On the other hand, steps 902, 1503, and 1504 of FIG. 15 and a sequence of processes in the flowchart of FIG. 16 are carried out during the second-half period (see FIG. 10(b)) of the cell time during which a cell associated with an arbitrary connection $c_n$ flows into the UPC/NPC circuit 801 of FIG. 8.

First, the cell identification number n corresponding to the connection $c_n$ is subtracted from the global time counter value $t_c$ to thereby obtain the local time counter value $t_{cd}$ corresponding to the connection $c_n$ with which the currently received cell is associated (step 902 in FIG. 15).

Next, a threshold L stored in that area in the RAM 802 which corresponds to that connection $c_n$ is added to the local time counter value $t_{cd}$ for the currently received cell (step 1503 in FIG. 15). The result, $t_{cd}$+L, has a bit length which is one bit longer than that of the local time counter value $t_{cd}$.

Next, a value obtained by adding one bit corresponding in value to the overflow flag OVF to the most significant portion of the bit string of the predicted time TAT for the next incoming cell which is stored in the RAM area corresponding to the connection $c_n$ is subtracted from the sum $t_{cd}$+L to thereby obtain a determination value A (step 1504 in FIG. 15). The one bit becomes 1 when OVF=1, 0 when OVF=0, and an arbitrary value when OVF=−1 (in this case, the determination in step 1601 in FIG. 16 is YES, so that the result of that subtraction is not used). As described previously in connection with the principles of the first embodiment associated with the VS algorithm, when OVF=1, TAT1 is set as the subtrahend and, when OVF=0, TAT2 is set as the subtrahend (see FIG. 4).

Subsequent to the sequence of processes, determination logic in the form of the flowchart of FIG. 16 is implemented.

First, a determination is made as to whether or not the overflow flag OVF stored in the RAM area corresponding to the connection $c_n$ is −1 (step 1601).

When OVF=−1 (YES in step 1601), it is decided that the currently received cell is conformable. In step 1602, the predicted time TAT for the next incoming cell for the connection $c_n$ is calculated by new $TAT=t_{cd}+I$ As described previously, when the result of this operation is greater in bit length than the local time counter value $t_{cd}$, an overflow flag of 1 is stored in the RAM area corresponding to the connection $c_n$; otherwise, an overflow flag of 0 is stored. However it should be noted that the addend I is set so that the result of that operation will not be two or more bits longer than the local time counter value $t_{cd}$. The calculated predicted time TAT for the next incoming cell is also stored in a RAM area corresponding to the connection $c_n$. In the example of FIG. 17, a cell for the connection $c_0$ is received at time t0 when the local time counter value $t_{cd0}$ for the connection $c_0$ reaches $t_{cd0-L}$ and it is decided that the cell is conformable. And then, in step 1602, the addend $I_0$ stored in the RAM area corresponding to the connection $c_0$ is added to that local time counter value $t_{cd0-L}$. As a result, the newly calculated predicted time TAT for the next incoming cell becomes the local time counter value tcdo-N for the connection $c_0$ at time $t_3$. In this case, the result of that addition does not exceed the bit length of the local time counter value $t_{cd0}$ and thus an overflow flag OVF of 0 is stored in the RAM area corresponding to the connection $c_0$. For connection $c_{4095}$, on the other hand, a cell is received at time $t_1$ when the local time counter value $t_{cd4095}$ reaches $t_{cd4095-L}$ and it is decided that the cell is conformable. And then, in step 1602, the addend $I_{4095}$ stored in the RAM area corresponding to the connection $c_{4095}$ is added to the local time counter value $t_{cd4095-L}$. As a result, the newly calculated predicted time TAT for the next incoming cell becomes the local time counter value $t_{cd4095-NX}$ for the connection $c_{4095}$. In this case, the result of that addition exceeds the bit length of the local time counter value $t_{cd4095}$, so that an overflow flag OVF of 1 is stored in the RAM area corresponding to the connection $c_{4095}$. As a result, as the predicted time TAT for the next incoming cell $t_{cd4095-NX}$ will be adopted in the range from time $t_1$ to $t_2$ and $t_{cd4095-N}$ will be adopted after time $t_2$.

If the overflow flag OVF is not −1 (NO in step 1601), then a determination is made as to whether or not the determination value A calculated in step 1504 in FIG. 15 is 0 or more (step 1603). As shown in FIG. 18, the determination value A indicates whether or not the local time counter value $t_{cd}$ for connection $c_n$ when a cell in the connection $c_n$ is received, which is allowed to have a margin of threshold L, is a time after the predicted time TAT (=$t_{cd-L}$+I: $t_{cd-L}$ is the local time counter value when the last cell was received) for the next incoming cell which was calculated when the last cell was received and stored in the RAM area corresponding to the connection $c_n$.

If the determination value A is smaller than 0 (NO in step 1603), then it is decided that the incoming cell is unconformable.

If, on the other hand, A is 0 or more (YES in 1603), then it is decided that the incoming cell is conformable.

Further, if the overflow flag OVF stored in the RAM area corresponding to the connection $c_n$ is equal to 1 (NO in step 1604) or if the overflow flag OVF is 0 and moreover the local time counter value $t_{cd}$ for the connection $c_n$ when the current cell is received exceeds the predicted time TAT for the next incoming cell stored in the RAM area corresponding to the connection $c_n$ (YES in step 1604 and NO in step 1605), then it is decided that the cell interval is sufficient. In this case, in step 1602, the predicted time TAT for the next incoming cell for the connection $c_n$ is calculated by the following equation, then stored in the RAM area corresponding to the connection $c_n$, and the overflow flag in that area is updated.

new $TAT=t_{cd}+I$

On the other hand, when the overflow flag OVF stored in the RAM area corresponding to the connection $c_n$ is 0 (YES in step 1604) and the local time counter value $t_{cd}$ for the connection $c_n$ when the current cell is received indicates a time before the predicted time TAT for the next incoming cell stored in the RAM area corresponding to the connection $c_n$ (YES in step 1605), i.e., the local time counter value $t_{cd}$ is within the range of the margin L shown in FIG. 18, then it is decided that the incoming cell is conformable, but the cell interval is somewhat insufficient. In this case, in step 1606, the predicted time for the next incoming cell for the connection $c_n$ is calculated by the following equation, then stored in the corresponding RAM area.

new $TAT=$old $TAT+I$

As with step 1602, in this case as well, when the result of this operation exceeds the bit length of the local time counter value $t_{cd}$, an overflow flag OVF of 1 is stored in the corresponding RAM area; otherwise, an overflow flag OVF of 0 is stored.

Arrangement of the second embodiment associated with the VS algorithm

Figure 20:
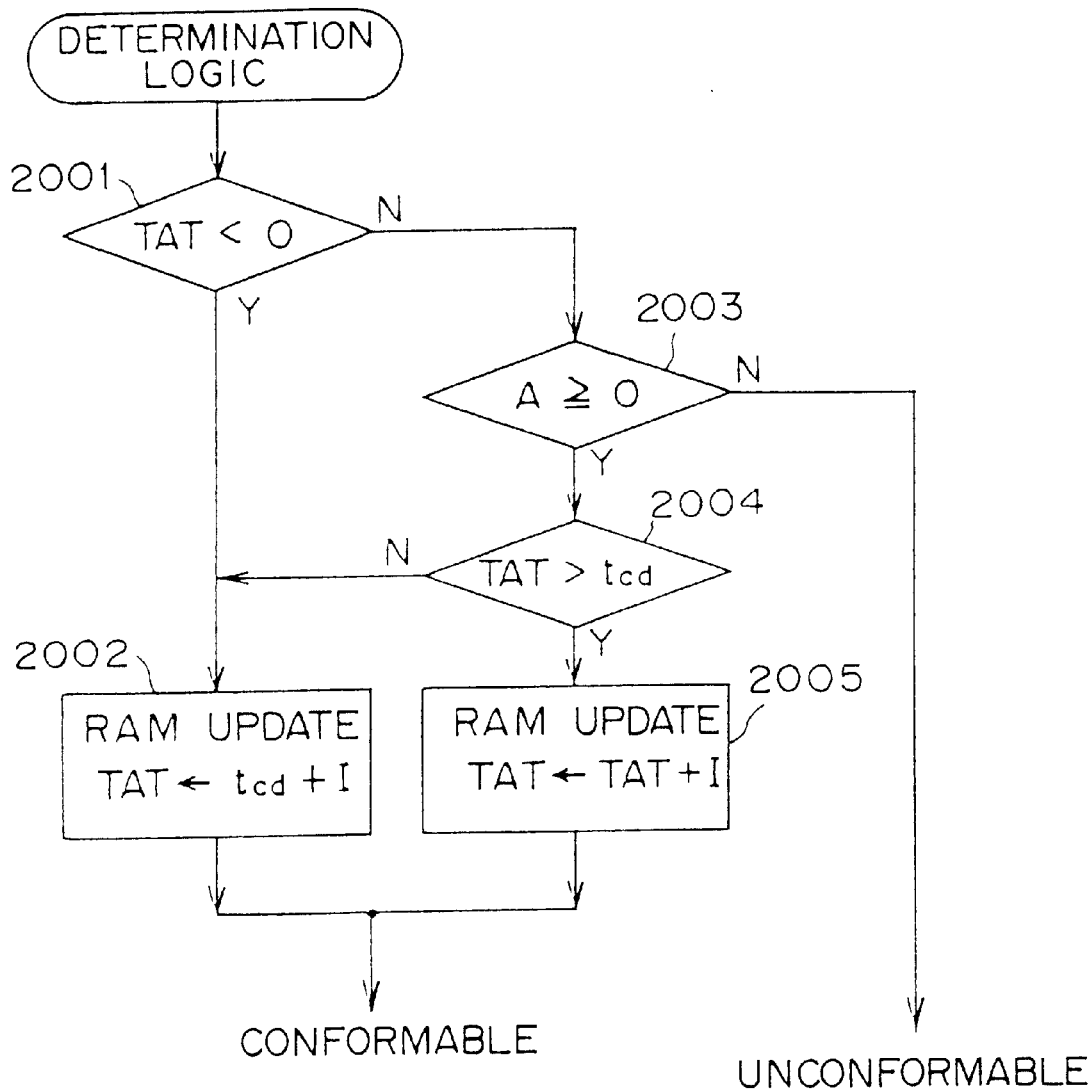
FIG. 20 is the second operational flowchart of the second embodiment based on the VS algorithm.
Figure 21:
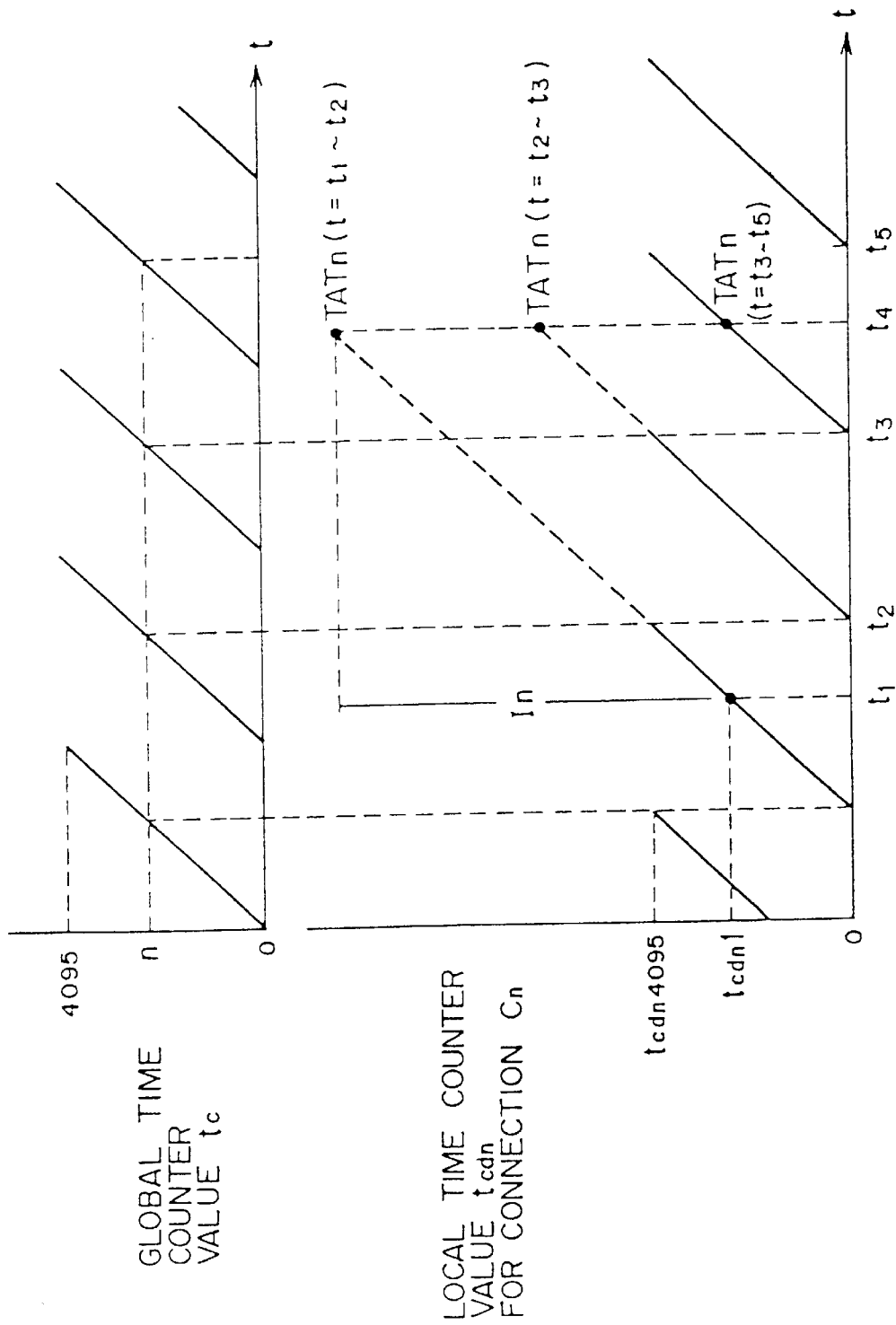
FIG. 21 is the first diagram explanatory of the operation of the second embodiment based on the VS algorithm.
Figure 22:
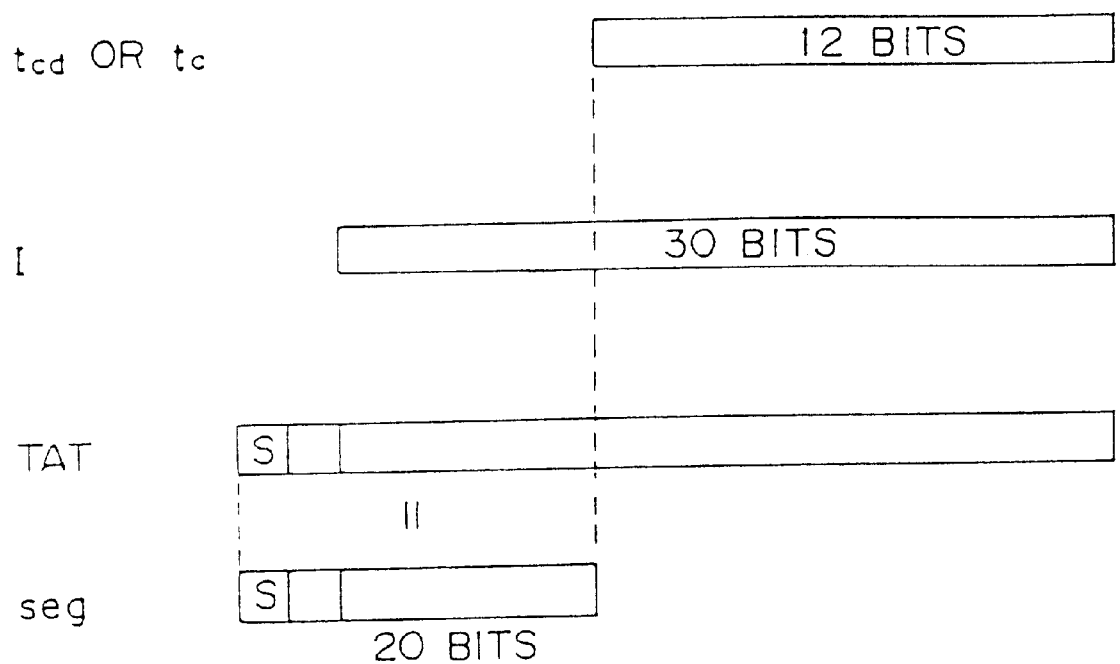
FIG. 22 is the second diagram explanatory of the operation of the second embodiment based on the VS algorithm.

FIGS. 19 and 20 are operational flowcharts for the UPC or NPC function that the UPC/NPC circuit 801 of FIG. 8 carries out in the second embodiment for the VS algorithm, and FIGS. 21 and 22 are diagrams explanatory of the operation of the present embodiment.

In the RAM 802 of FIG. 8 such various parameters as shown in FIG. 19 are stored.

In the present embodiment, as described previously in connection with the principles of the second embodiment for the VS algorithm, a string "seg" of high-order bits other than low-order bits corresponding in bit length to the local time counter value $t_{cd}$ in a bit string of the predicted time TAT for the next incoming cell, indicates the number of times the local time counter value $t_{cd}$ will overflow in the time interval from the current time to the predicted time TAT for the next incoming cell. The UPC or NPC function is implemented on the basis of the high-order bit string seg.

In the flowchart of FIG. 19, steps 901, 902 and 903 are identical to steps 901, 902 and 903, respectively, of FIG. 9.

In this case, the event that the global time counter value $t_c$ becomes equal to the cell identification number n (0<n<4095) for one connection $c_n$ triggers (step 903) a process of updating the high-order bit string seg for that connection (steps 1901 and 1902) in the first-half period of the current cell time (FIG. 10(a)). In the example of FIG. 21, for the connection $c_n$, this trigger occurs at times $t_2$, $t_3$ and $t_5$ when the global time counter value $t_c$ reaches the cell identification number n.

That is, on the occurrence of the trigger, a determination is made as to whether or not the predicted time TAT for the next incoming cell stored in the RAM area corresponding to the connection $c_n$ is smaller than 0 (step 1901).

If the predicted time TAT is 0 or more (NO in step 1901), then the high-order bit string seg of the predicted time TAT is decremented by one (step 1902). A new predicted time TAT for the next incoming cell containing the resulting high-order bit string seg is rewritten into the RAM 802.

If, on the other hand, the predicted time TAT is smaller than 0 (YES in step 1901), then the predicted time TAT is not updated.

In the example of FIG. 21, the predicted time $TAT_n$ for the next incoming cell calculated at the cell receiving time $t_1$ when the local time counter value $t_{cdn}$ for the connection $c_n$ reaches 1 (=$t_{cdn1}$), is updated in the time intervals $t_1$ to $t_2$, $t_2$ to $t_3$, and $t_3$ to $t_5$, where $t_2$, $t_3$ and $t_5$ indicate times when the local time counter value $t_{cdn}$ reaches 4095 (=$t_{cdn4095}$).

On the other hand, steps 902, 1903, and 1904 of FIG. 19 and a sequence of processes in the flowchart of FIG. 20 are carried out during the second-half period (see FIG. 10(b)) of the cell time during which a cell for an arbitrary connection $c_n$ flows into the UPC/NPC circuit 801 of FIG. B.

First, the cell identification number n corresponding to the connection $c_n$ is subtracted from the global time counter value $t_c$ to thereby obtain the local time counter value $t_{cd}$ for the connection $c_n$ with which the currently received cell is associated (step 902 in FIG. 19).

Next, as in FIG. 15, the threshold L stored in the RAM area corresponding to the connection $c_n$ is added to the local time counter value $t_{cd}$ for the currently received cell (step 1903 in FIG. 19). The sum $t_{cd}+L$ is represented in a bit length that is longer than that of the local time counter value $t_{cd}$.

Next, the predicted time TAT stored in the corresponding RAM area is subtracted from the sum $t_{cd}+L$ to thereby obtain a determination value A (step 1904 in FIG. 19). Since, as described above, the predicted time TAT contains the high-order bit string seg that indicates the number of times the local time counter value $t_{cd}$ will overflow during the time interval from the current time to the predicted time TAT for the next incoming cell, the above subtraction will be performed including the high-order bit string seg. In the example of FIG. 21, the predicted time $TAT_n$ for the next incoming cell shown in FIG. 21 will be subtracted when the local time counter value $t_{cd}$ for the currently received cell lies in the range $t_1$ to $t_2$, $t_2$ to $t_3$, or $t_3$ to $t_5$.

Subsequent to the above-described sequence of processes, determination logic is implemented in the form of the flowchart of FIG. 20.

First, a determination is made as to whether or not the predicted time TAT for the next incoming cell stored in the RAM area corresponding to connection $c_n$ is −1 (step 2001).

As described previously in connection with the principles of the second embodiment associated with the VS algorithm, it is when no cell is received over a sufficiently long time that the high-order bit string seg takes a negative value and the predicted time TAT itself that contains that bit string takes a negative value. In the example of FIG. 21, it corresponds to the case where the local time counter value $t_{cd}$ when the current cell is received extends beyond time $t_5$. In such a case, the determination in step 2001 is YES.

If the determination in step 2001 is YES, then the current cell is considered conformable and the procedure goes to subsequent step 2002 in which the predicted time TAT for the next incoming cell for connection $c_n$ is calculated by new $TAT=t_{cd}+I$ The resulting predicted time TAT will, as described previously, contain the high-order bit string seg that indicates the number of times the local time counter value $t_{cd}$ will overflow during the time interval from the current time to the predicted time TAT for the next incoming cell. In the example of FIG. 21, when a cell is received at time $t_1$ when the local time counter value $t_{cdn}$ for connection $c_n$ reaches 1 (=$t_{cdn1}$), the addend in stored in the corresponding RAM area is added to the local time counter value $t_{cdn1}$, whereby the predicted time TATn for the next incoming cell which is seen as the range $t_1$ to $t_2$ is calculated.

If, on the other hand, the determination in step 2001 is NO, then a determination is made as to whether the determination value A calculated in step 1904 of FIG. 19 is 0 or more (step 2003). The determination value A has the same significance as it has in the case of FIGS. 15 and 16.

If the determination value A is smaller than 0 (NO in step 2003), it is decided that the incoming cell is unconformable.

If, on the other hand, the determination value A is not smaller than 0 (YES in step 2003), then it is decided that the incoming cell is conformable.

Further, if the local time counter value $t_{cd}$ for connection $c_n$ when the current cell is being received extends beyond the predicted time TAT for the next incoming cell for connection $c_n$ stored in the corresponding RAM area (NO in step 2004), then it is decided that the cell interval is sufficient and the procedure goes to step 2002 in which the predicted time TAT for the next incoming cell for connection $c_n$ is calculated by the following equation and then stored in the corresponding area in the RAM 802.

New $TAT=t_{cd}+I$

If, on the other hand, that local time counter value $t_{cd}$ for connection $c_n$ does not extend beyond the predicted time TAT stored in the corresponding RAM area (YES in step 2004), i.e., if the local time counter value $t_{cd}$ is within the range of margin L shown in FIG. 18, then it is decided that the incoming cell is conformable, but the cell interval is somewhat insufficient and the procedure goes to step 2005 in which the predicted time TAT for the next incoming cell for connection $c_n$ is calculated by the following equation and then stored in the corresponding RAM area.

new $TAT$=old $TAT+I$

As described previously in connection with the principles of the second embodiment associated with the VS algorithm, the global time counter value $t_c$ and the local time counter value $t_{cd}$ for each connection $c_n$ need not have a bit length that allows the cell interval to be measured and are required only to have a bit length that allows the number of connections to be processed in parallel to be counted, for example, up to 4096 connections to be counted. As shown in FIG. 22, the global time counter value $t_c$ and the local time counter value $t_{cd}$ are 12 bits in length, by way of example. In contrast, the addend I is required to have a bit length that allows the cell interval to be measured and hence is 30 bits in length, as an example, as shown in FIG. 22. The predicted time TAT is 32 bits, the sum of 12 bits of the local time counter value $t_{cd}$ and 20 bits of the high-order bit string seg, as shown in FIG. 22. The most significant bit of the predicted time TAT (the most significant bit of the high-order bit string seg) is a sign bit S. As described previously, the subtraction of one from the high-order bit string seg each time the local time counter value $t_{cd}$ overflows is equivalent to the subtraction of the expressive maximum value of the local time counter value $t_{cd+1}$ from the predicted time TAT.

Arrangement of the third embodiment associated with the VS algorithm

Figure 23:
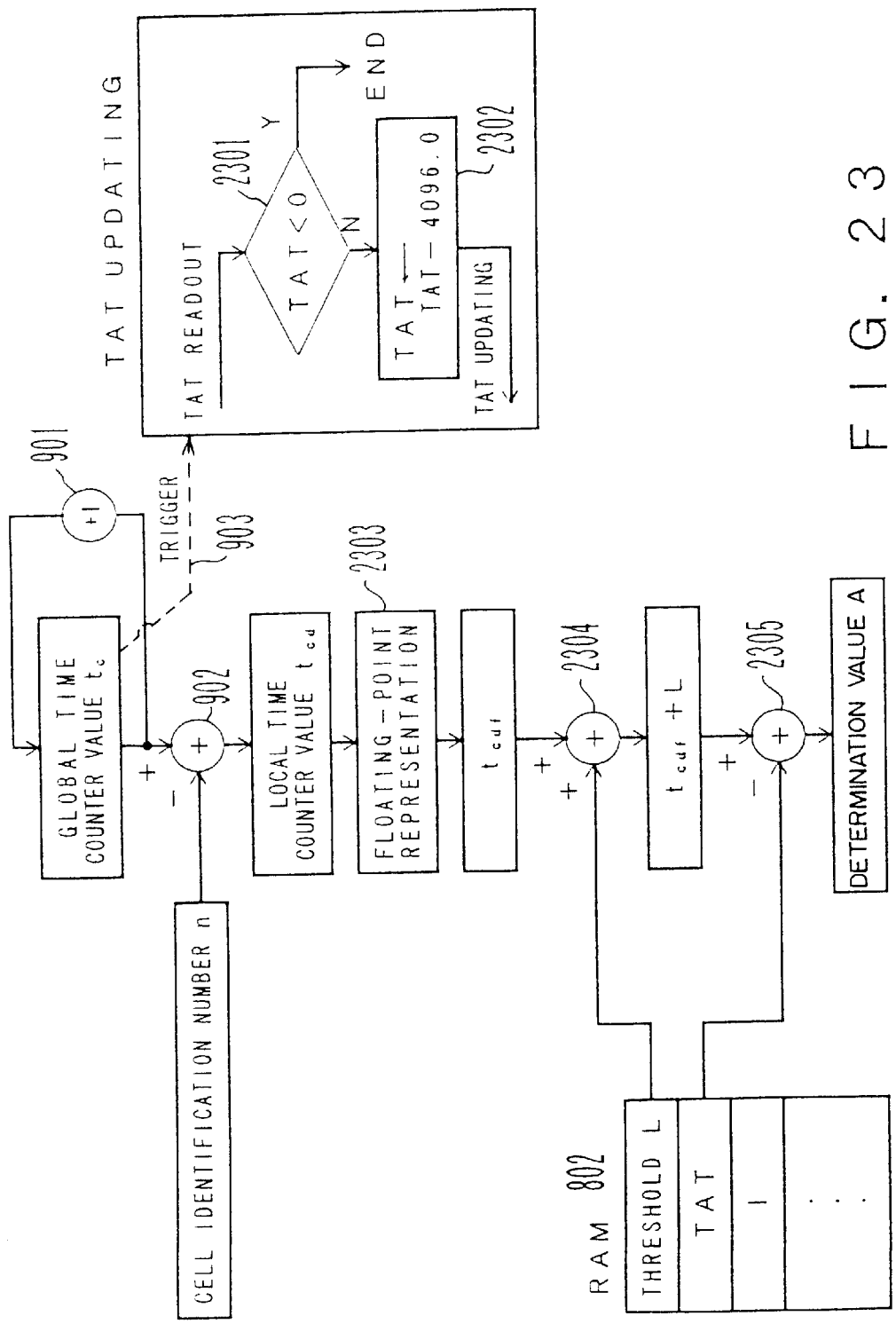
FIG. 23 is an operational flowchart of the third embodiment based on the VS algorithm.
Figure 24:
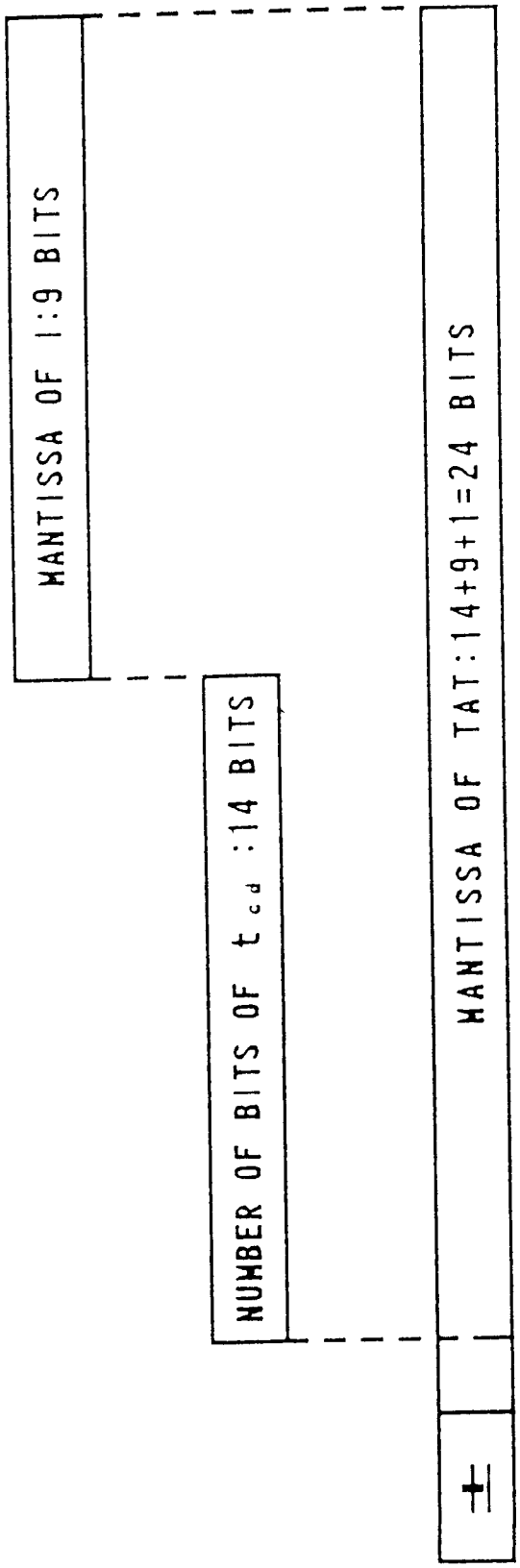
FIG. 24 is a diagram explanatory of the operation of the third embodiment based on the VS algorithm.

FIG. 23 is an operational flowchart of the UPC or NPC function that the UPC/NPC circuit of FIG. 8 carries out in the third embodiment for the VS algorithm, and FIG. 24 is a diagram explanatory of the operation of the third embodiment.

In RAM 802 of FIG. 8 such various parameters as shown in FIG. 23 are stored.

As described in connection with the principles of the third embodiment associated with the VS algorithm, in this embodiment, the operation, TAT=$t_{cd1}$+I, for the predicted time TAT for the next incoming cell, is carried out in floating-point representation as shown in FIG. 24. Each time the local time counter value $t_{cd}$ for connection $c_n$ overflows, the expressive maximum value of the local time counter value $t_{cd}$, $t_{cdn}$+1, is subtracted from the predicted time TAT.

In the flowchart of FIG. 23, steps 901, 902 and 903 are identical to steps 901, 902 and 903, respectively, of FIG. 9.

In this case, the event that the global time counter value $t_c$ becomes equal to the cell identification number n (0<n<4095) for each connection $c_n$ triggers (step 903) steps 2301 and 2302 in which the predicted time TAT for the next incoming cell for connection $c_n$ is updated in the first-half period of the current cell time (see FIG. 10(a)).

Namely, on the occurrence of the trigger, a determination is first made as to whether or not the predicted time TAT stored in the corresponding RAM area is smaller than 0 (step 2301).

If the predicted time TAT is not smaller than 0 (NO in step 2301), then the expressive maximum value of the local time counter value $t_{cd}$, $t_{cdn}$+1, 4096.0 in this embodiment, is subtracted from the predicted time TAT (step 2302) and the resulting new predicted time TAT is rewritten into the RAM 802.

If, on the other hand, the predicted time TAT is smaller than 0 (YES in step 2301), it is not updated.

In the second-half period (FIG. 10(b)) of the cell time that a cell for connection $c_n$ flows into the UPC/NPC circuit 801 of FIG. 8, steps 902, 2303, 2304 and 2305 of FIG. 23 and the sequence of processes in the flowchart of FIG. 20 are carried out.

First, the cell identification number n corresponding to connection $c_n$ is subtracted from the global time counter value $t_c$, whereby the local time counter value $t_{cd}$ corresponding to connection $c_n$ is obtained (step 902 in FIG. 23).

Next, the numeric representation of the local time counter value $t_{cd}$ is transformed into the floating-point representation $t_{cdf}$ (step 2303 in FIG. 23).

Next, as in FIG. 15 or 19, the threshold L stored in the RAM area corresponding to connection $c_n$ is added to the floating-point local time counter value $t_{cdf}$ for the current cell (step 2304 in FIG. 23). The sum, $t_{cdf}$+L, is also in floating-point representation.

Next, the predicted time TAT in floating-point representation stored in the corresponding RAM area is subtracted from the sum $t_{cdf}$+L to yield a determination value A (step 2305 in FIG. 23).

Subsequent to the above-described sequences of process, determination logic is implemented in the form of the flowchart of FIG. 20. Note that all the operations in the flowchart are performed in floating-point representation.

What is claimed is:

1. An overflow processing method for values of counters which perform a counting operation over the same range in parallel for a plurality of objects to be counted, comprising the steps of:

using each of counter values which are set to be different from one another from the beginning, for each of the plurality of objects to be counted; and performing overflow processing on each of the counter values corresponding to each of the plurality of objects to be counted, at timing which is different depending on each of the plurality of objects to be counted, for each of the plurality of objects to be counted.

2. The method according to claim 1, wherein each of said counter values for said objects has a unique offset with respect to a reference counter value.

3. For use in a cell switching system for switching fixed-length cells, an overflow processing method for counters which perform a counting operation on a plurality of connections over the same range in parallel to count times when cells are received for each of said connection, comprising the steps of:

counting, for each of said connections, a local time counter value which is a counter value having a unique offset value with respect to a global time counter value which is a reference time counter value; and performing overflow processing on said local time counter value for each connection at the time when said global time counter value reaches said offset value corresponding to said connection.

4. For use in a cell switching system for switching fixed-length cells, a cell flow control method for counting cell intervals at which cells are received for each of connections over the same range and evaluating said cell interval to thereby control the flow of cells, comprising the steps of:

counting, for each of said connections, a local time counter value which is a counter value having a unique offset value with respect to a global time counter value which is a reference time counter value;

updating, for each of said connections, the overflow state of said local time counter value at the time when said global time counter value reaches said offset value corresponding to said connection; and evaluating, when a cell for a connection is being received, the time interval between the time of receiving said cell and the time of receiving a previously received cell for said connection on the basis of said local time counter value for said connection and the overflow state of said local time counter value for said connection.

5. The method according to claim 4, wherein the overflow state corresponds to one of a state where no overflow has occurred, a state where overflow has occurred once, and a state where overflow has occurred twice or more.

6. For use in a cell switching system for switching fixed-length cells, a cell flow control method based for counting cell flow times at which cells are received for each of connections over the same range and making a comparison between the time when a cell is received and a time of receiving the next incoming cell predicted at the time when the previous cell was received to thereby control the flow of cells, comprising the steps of:

counting, for each of said connections, a local time counter value which is a counter value having a unique offset value with respect to a global time counter value which is a reference time counter value;

calculating, at the time when a cell is received, a predicted time when the next cell will be received on the basis of a local time counter value corresponding to a connection associated with said cell being received and calculating the overflow state of said local time counter value at said predicted time for the next cell;

updating, for each connection, the overflow state of said local time counter value at the time when said global time counter value reaches said offset value corresponding to said connection; and evaluating, when a cell associated with a connection is being received, the time of receiving said cell for said connection on the basis of said local time counter value for said connection, the overflow state of said local time counter value for said connection, and said predicted time for reception of the next cell.

7. The method according to claim 6, wherein, at the time when a cell is received, a predicted time when the next cell will be received is calculated on the basis of a local time counter value corresponding to a connection associated with said cell being received and an overflow flag is set which indicates whether or not said local time counter value corresponding to said connection overflows until said predicted time for the next cell is reached, at the time when said global time counter value reaches said offset value corresponding to a connection, said overflow flag for said local time counter value corresponding to said connection is reset if it has been set and reset information is set to indicate resetting has occurred if said overflow flag has not been set, and when a cell associated with a connection is being received, the time of receiving said cell is detected on the basis of said local time counter value for said connection, the overflow state of said local time counter value for said connection, said reset information corresponding to said connection, and said predicted time for reception of the next cell to thereby make a conformity/nonconformity determination for said cell being received.

8. The method according to claim 6, wherein, at the time when a cell is received, a predicted time when the next cell will be received is calculated on the basis of a local time counter value corresponding to a connection associated with said cell being received and the number of times of overflow is set which indicates the number of times said local time counter value overflows until said predicted time is reached, at the time when said global time counter value reaches said offset value for a connection, the number of times of overflow of said local time counter value corresponding to said connection is decremented by one, and when a cell associated with a connection is being received, the time interval between the time of receiving said cell and the time of receiving a previously received cell for said connection is evaluated on the basis of said local time counter value for said connection, the number of times said local time counter value for said connection overflows, information indicating whether or not the number of times of overflow is a negative value, and said predicted time of receiving the next cell to thereby make a conformity/ nonconformity determination for said cell being received.

9. For use in a cell switching system for switching fixed-length cells, a cell flow control method for counting cell flow times at which cells are received for each of connections over the same range and making a comparison between the time when a cell is received and a time of receiving the next incoming cell predicted at the time when the previous cell was received to thereby control the flow of cells, comprising the steps of:

counting, for each of said connections, a local time counter value which is a counter value having a unique offset value with respect to a global time counter value which is a reference time counter value;

calculating, at the time when a cell is received, a predicted time when the next cell will be received on the basis of a local time counter value corresponding to a connection associated with said cell being received in floating-point representation, subtracting, for each connection, the sum of the maximum value of said local time counter value corresponding to said connection and one from said predicted time for the next cell corresponding to said connection at the time when said global time counter value reaches said offset value corresponding to said connection; and detecting, when a cell associated with a connection is being received, the time of receiving said cell corresponding to said connection on the basis of said local time counter value for said connection and said predicted time for the next cell corresponding to said connection.

10. For use in a cell switching system for switching fixed-length cells, an overflow processing device for counters which perform a counting operation on a plurality of connections over the same range in parallel to count times when cells are received for each of said connections, comprising:

a counter for counting, for each of said connections, a local time counter value which is a counter value having a unique offset value with respect to a global time counter value which is a reference time counter value; and a processor for controlling overflow on said local time counter value for each connection at the time when said global time counter value reaches said offset value corresponding to said connection.

11. For use in a cell switching system for switching fixed-length cells, a cell flow control device based for counting cell intervals at which cells are received for each of connections over the same range and deciding said cell interval to thereby control the flow of cells, comprising:

a counter for counting, for each of said connections, a local time counter value which is a counter value having a unique offset value with respect to a global time counter value which is a reference time counter value; a processor for updating, for each of said connections, the overflow state of said local time counter value at the time when said global time counter value reaches said offset value corresponding to said connection; and a detector for detecting, when a cell for a connection is being received, the time interval between the time of receiving said cell and the time of receiving a previous cell for said connection on the basis of said local time counter value for said connection and the overflow state of said local time counter value for said connection.

12. The device according to claim 11, wherein the overflow state corresponds to one of a state where no overflow has occurred, a state where overflow has occurred once, and a state where overflow has occurred two or more times.

13. For use in a cell switching system for switching fixed-length cells, a cell flow control device based for counting cell flow times at which cells are received for each of connections over the same range and making a comparison between the time when a cell is received and a time of receiving the next incoming cell that was predicted at the time when the previous cell was received, comprising:

a counter for counting, for each of said connections, a local time counter value which is a counter value having a unique offset value with respect to a global time counter value which is a reference time counter value;

a calculator for calculating, at the time when a cell is received, a predicted time when the next cell will be received on the basis of a local time counter value corresponding to a connection associated with said cell being received and calculating the overflow state of said local time counter value which occurs until said predicted time for the next cell is reached;

a processor for updating, for each connection, the overflow state of said local time counter value at the time when said global time counter value reaches said offset value corresponding to said connection; and a detector for detecting, when a cell associated with a connection is being received, the time of receiving said cell for said connection on the basis of said local time counter value for said connection, the overflow state of said local time counter value for said connection, and said predicted time of receiving the next cell.

14. The device according to claim 13, wherein, said control means calculates, at the time when a cell is received, a predicted time when the next cell will be received on the basis of a local time counter value corresponding to a connection associated with said cell being received and sets an overflow flag which indicates whether or not said local time counter value corresponding to said connection overflows until said predicted time for the next cell is reached, said updating means for resetting, at the time when said global time counter value reaches said offset value corresponding to a connection, said overflow flag for said local time counter value corresponding to said connection if it has been set and setting reset information to indicate resetting has occurred if said overflow flag has not been set, and said cell conformity/nonconformity determination means for detecting, when a cell associated with a connection is being received, the time of receiving said cell for said connection on the basis of said local time counter value for said connection, said overflow flag corresponding to said connection, said reset information corresponding to said connection, and said predicted time of receiving the next cell to thereby make a conformity/nonconformity determination for said cell being received.

15. The device according to claim 13, wherein, said control means calculates, at the time when a cell is received, a predicted time when the next cell will be received on the basis of a local time counter value corresponding to a connection associated with said cell being received and sets the number of times said local time counter value corresponding to said connection overflows until said predicted time is reached, said updating means decrements, at the time when said global time counter value reaches said offset value for a connection, the number of times said local time counter value corresponding to said connection overflows by one, and said cell conformity/nonconformity determination means examines, when a cell associated with a connection is being received, the time of receiving said cell for said connection on the basis of said local time counter value for said connection, the number of times said local time counter value for said connection overflows, information indicating whether or not the number of times of overflow is a negative value, and said predicted time of receiving the next cell to thereby make a conformity/nonconformity determination for said cell being received.

16. For use in a cell switching system for switching fixed-length cells, a cell flow control device based for counting cell flow times at which cells are received for each of connections over the same range and making a comparison between the time when a cell is received and a time of receiving the next incoming cell that was predicted at the time when the previous cell was received to thereby control the flow of cells, comprising:

counting means, for each of said connections, a local time counter value which is a counter value having a unique offset value with respect to a global time counter value which is a reference time counter value;

control means for calculating, at the time when a cell is received, a predicted time when the next cell will be received on the basis of a local time counter value corresponding to a connection associated with said cell being received in floating-point representation;

updating means for subtracting, for each connection, the sum of the maximum value of said local time counter value corresponding to said connection and one from said predicted time for the next cell corresponding to said connection at the time when said global time counter value reaches said offset value corresponding to said connection; and determination means for detecting, when a cell associated with a connection is being received, the time of receiving said cell corresponding to said connection on the basis of said local time counter value for said connection and said predicted time for the next cell corresponding to said connection.

* * * * *